United States Patent [19]
Newman

[11] Patent Number: 6,138,372
[45] Date of Patent: Oct. 31, 2000

[54] ROUTER GUIDE APPARATUS

[76] Inventor: Roger R. Newman, 20 Lytton Boulevard, Toronto Ontario, Canada, M4R 1L1

[21] Appl. No.: 09/207,519

[22] Filed: Dec. 9, 1998

[51] Int. Cl.[7] .............................. B27C 5/00; B23B 49/00
[52] U.S. Cl. .................. 33/638; 144/144.51; 144/144.1; 144/371; 144/372; 409/132; 409/181; 409/211
[58] Field of Search .............................. 33/626, 627, 628, 33/629, 630, 631, 632, 633, 634, 635, 636, 637, 638, 639, 640, 641, 642, 643, 645, 42, 43; 409/132, 175, 181, 182, 201, 211, 228; 144/135.2, 135.3, 137, 139, 144.52, 371, 372, 144.1

[56] References Cited

U.S. PATENT DOCUMENTS

| | | | |
|---|---|---|---|
| D. 351,774 | 10/1994 | Witt | D8/71 |
| 817,991 | 4/1906 | Ross | 33/43 |
| 3,734,151 | 5/1973 | Skripsky | 144/1 R |
| 4,095,633 | 6/1978 | Kimball et al. | 144/144 R |
| 4,215,731 | 8/1980 | Maynard | 144/136 C |
| 4,290,464 | 9/1981 | Marsan | 144/136 C |
| 4,291,735 | 9/1981 | Silken | 144/134 R |
| 4,465,114 | 8/1984 | Schumacher | 144/286 R |
| 4,527,605 | 7/1985 | Ede et al. | 144/286 R |
| 4,749,013 | 6/1988 | Ducate, Sr. | 144/145 R |
| 4,753,531 | 6/1988 | Hiratsuka et al. | 356/246 |
| 4,843,728 | 7/1989 | Francis | 33/42 |
| 4,977,938 | 12/1990 | Greeson | 144/134 |
| 5,016,358 | 5/1991 | Rice et al. | 33/569 |
| 5,273,090 | 12/1993 | Klemma | 144/134 R |
| 5,345,986 | 9/1994 | Kieffer | 144/372 |
| 5,375,951 | 12/1994 | Veale | 409/131 |
| 5,396,937 | 3/1995 | Clausen | 144/134 R |
| 5,458,171 | 10/1995 | Ward | 144/84 |
| 5,533,556 | 7/1996 | Whitney | 144/144.52 |
| 5,630,455 | 5/1997 | Julien | 144/372 |
| 6,039,095 | 3/1900 | Newman | 144/144.52 |
| 6,061,921 | 5/2000 | Adams et al. | 33/638 |
| 6,068,036 | 5/2000 | Cassidy | 144/134.1 |

OTHER PUBLICATIONS

Spielman, P., *The New Router Handbook* (New York: Sterling Publishing Co., 1993) p. 164.

*Primary Examiner*—G. Bradley Bennett
*Assistant Examiner*—G. Verbitsky
*Attorney, Agent, or Firm*—Bereskin & Parr

[57] ABSTRACT

The present invention provides a guide apparatus for use with a portable router, for enabling the router to rout an edge of a workpiece at virtually any angle between 0° and 90°. The guide apparatus comprises: a main body for receiving a router base and including an opening for a router bit to extend therethrough; a reference member having a planar surface for abutment with a planar surface of a workpiece and including a guide edge along one edge thereof; a hinge means connecting the reference member to the main body; a securing means for securing the reference member to the main body at a desired angle; and a guide bar securable relative to the workpiece and providing a guide surface for abutting the guide edge of the reference member, to guide the router bit of the router mounted on the main body along the edge of the workpiece.

22 Claims, 22 Drawing Sheets

FIG. 9A
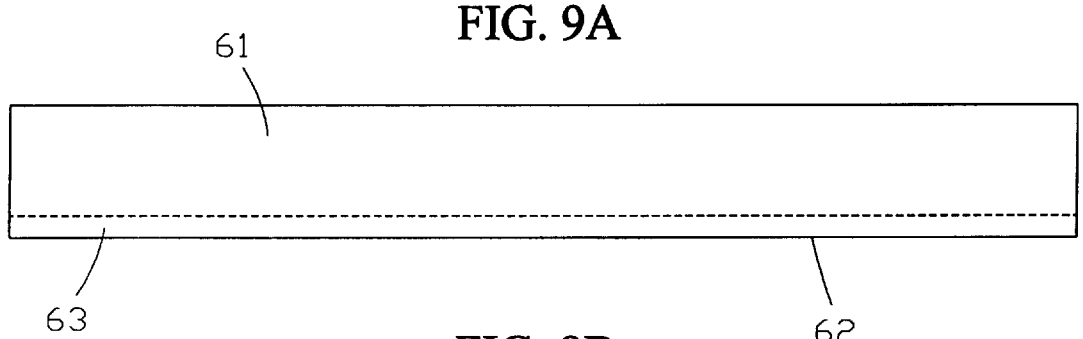
FIG. 9B
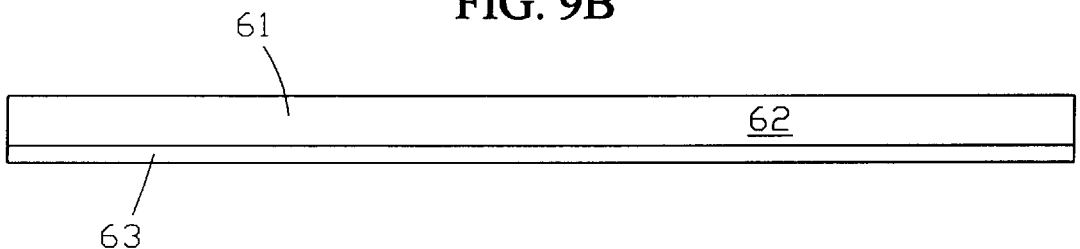
FIG. 9C
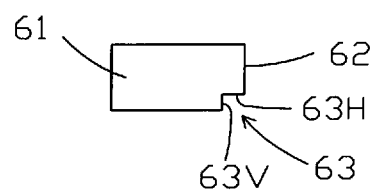
FIG. 18A
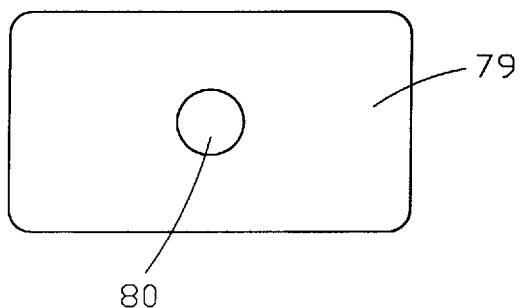
FIG. 18B
FIG. 18C
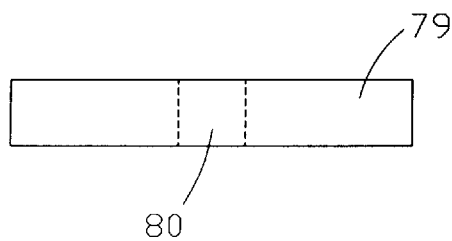
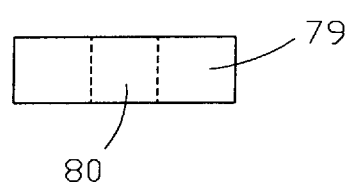

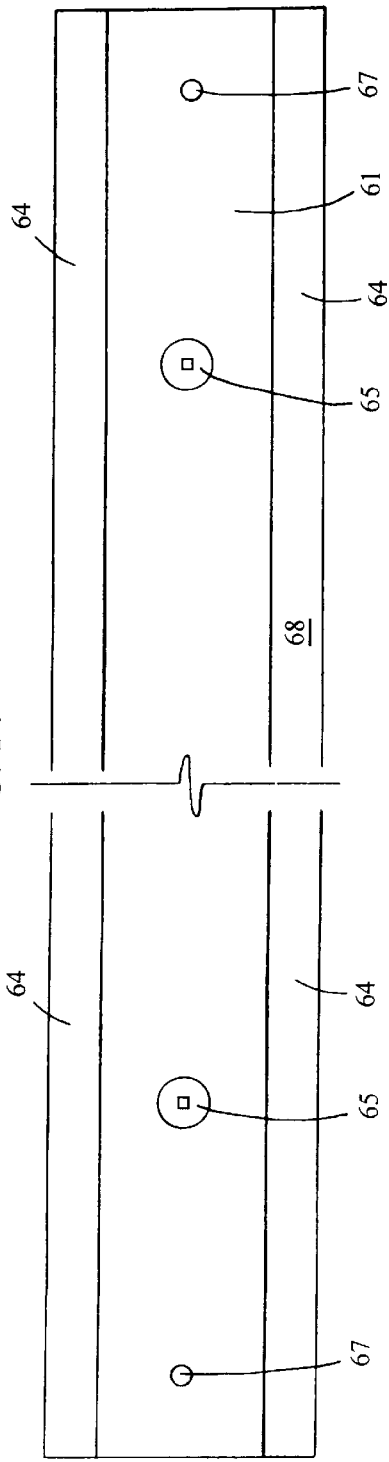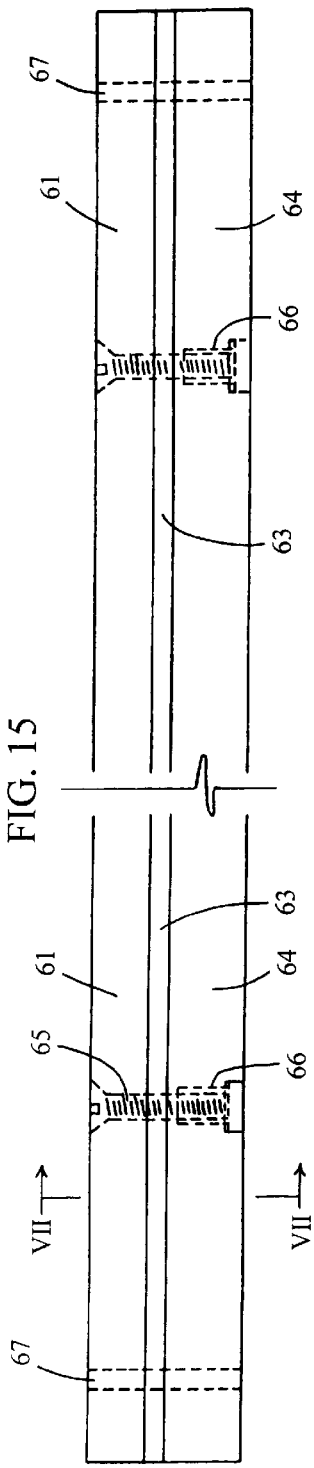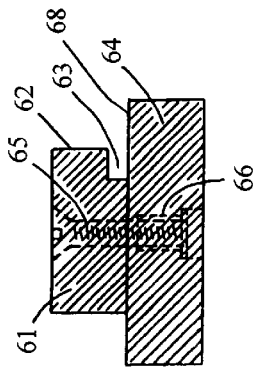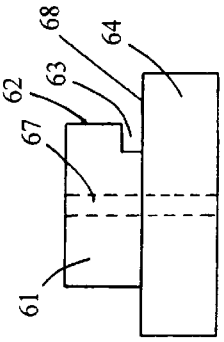

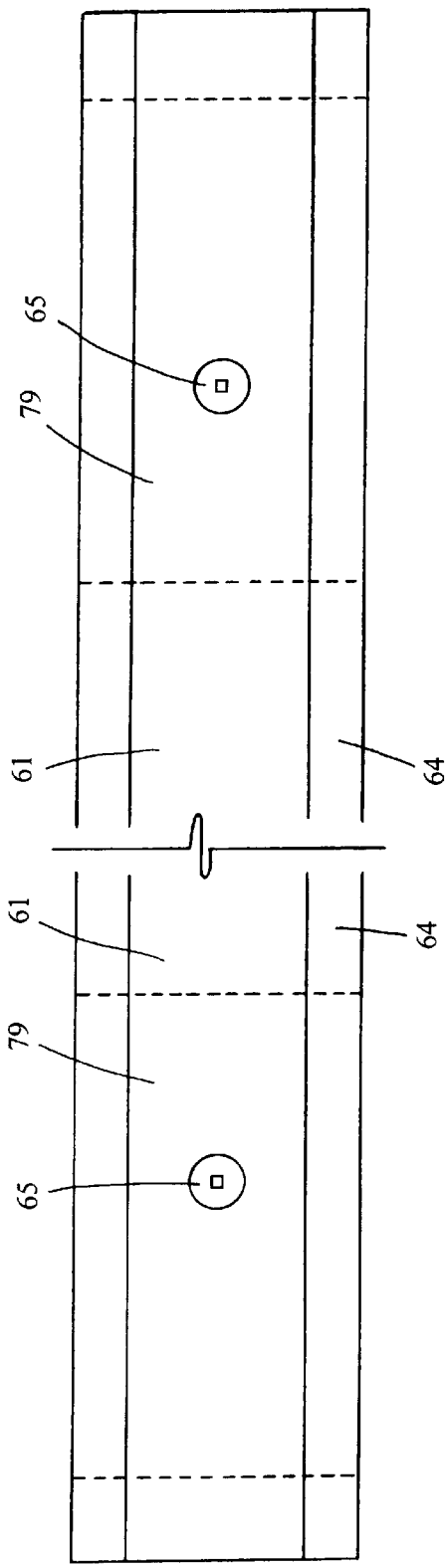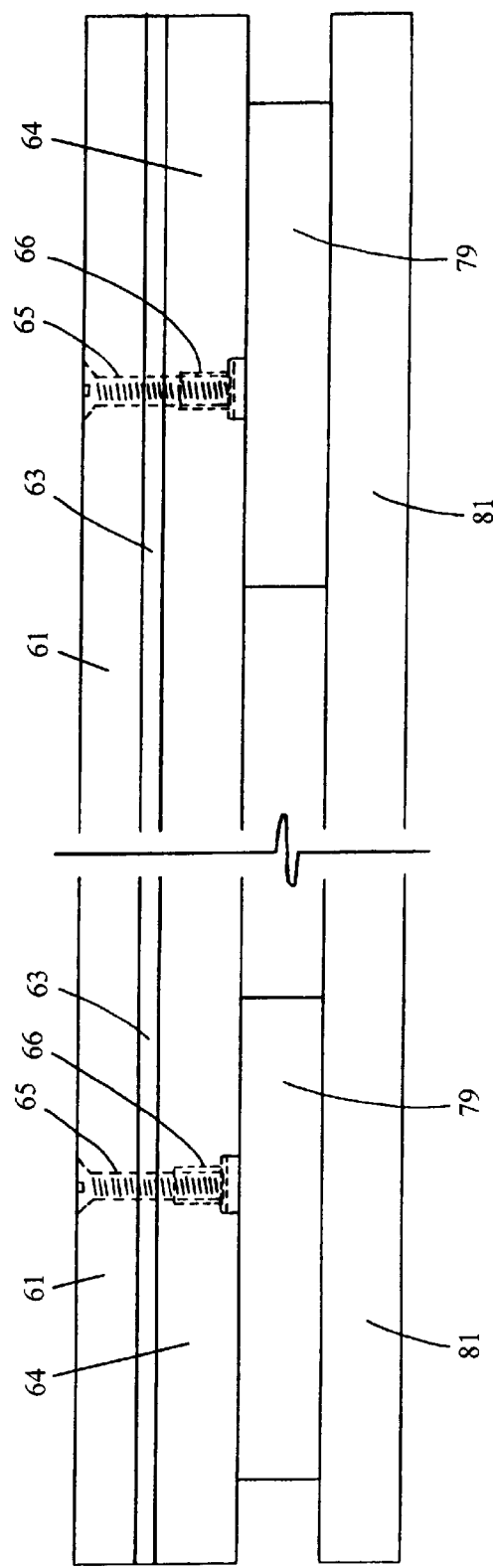

SETUP FOR ROUTING BEVELS ALONG NARROW BOARDS WHEN THE WORKPIECE THICKNESS IS EXACTLY 3/4"

SETUP FOR ROUTING BEVELS ALONG NARROW BOARDS WHEN THE WORKPIECE THICKNESS IS MORE THAN 3/4"

SETUP FOR ROUTING BEVELS ALONG NARROW BOARDS WHEN THE WORKPIECE THICKNESS IS LESS THAN 3/4"

ROUTER GUIDE APPARATUS

FIELD OF THE INVENTION

This invention relates to a device for use with a standard hand-held router which enables the routing of bevels and mitres onto the sides or ends of boards and sheet materials at virtually any angle ranging between 0° and 90°.

BACKGROUND OF THE INVENTION

In order to rout bevels and mitres at an angle, various designs have been proposed in the prior art. One example is found in Spielman, P., *The New Router Handbook* (New York: Sterling Publishing Co., 1993) at p. 164. In illus. 12–33 on p. 164, a router bracket is shown which can hold a router motor unit while it is tilted as much as 45°. As shown in illus. 12–35 on p. 164 of Spielman, the tilted router bit can carve grooves having various profiles into the surface of a workpiece. However, the range of angles which can be cut using the device shown on p. 164 of Spielman, is limited, the router unit being unable to tilt beyond 45°. In addition, the router bracket device shown on p. 164 of Spielman is not suited for routing bevels and mitres onto the sides or ends of boards, since most of the weight is at one end of the square plywood base, and that end would have to be overhanging the edge of the workpiece which is to be routed. Rather, it is intended for routing an angled groove across the middle of a flat surface.

In U.S. Pat. No. 4,977,938 (Greeson), a cutting guide for use with a hand-held router is shown, the cutting guide having a guide fence 50 which pivots about a base 20. The guide fence 50 of the cutting guide disclosed in Greeson '938 has a flanged portion 56 which butts against the edge of the workpiece being cut. By using this flanged portion 56 to position the router bit, it is assumed that the edge of the workpiece is straight and true. However, if this is not the case, the router bit will follow any curvature or imperfection along the workpiece edge. In addition, the cutting guide shown in Greeson '938 has a pivoting hinge 54 which is located adjacent to the flanged portion 56 of the guide fence 50. As shown in FIGS. 6 and 7 of Greeson '938, due to the location of the pivoting hinge 54, only the side of the router bit is used for bevelling or chamfering the underside edge of the workpiece 90. This has a tendency of compromising the edge of the workpiece 90 which is used as a reference by the flanged portion 56.

Greeson '938 also discloses a device having an adjustment means for adjusting the lateral position of the router on the top surface. This adjustment is used for finally adjusting the depth of the bevel or chamfer cuts into the edge of the workpiece. However, the speed of adjustment is quite slow, being limited by the travel over the thread of positioning adjustment screw 32 as it is turned. Additionally, the accuracy and reliability of using this method to control the depth of the cut when routing a bevel or chamfer would be inferior to using the blade depth control on the router itself for this purpose.

A further disadvantage in Greeson '938 is that it relies upon operator skill and care to maintain the guide fence 50 in position.

SUMMARY OF THE INVENTION

The present invention provides a router guide apparatus for use with a standard hand-held router which enables the routing of bevels and mitres onto the sides and ends of boards or sheet materials, at virtually any angle ranging between 0° and 90°. The present invention is intended to overcome the drawbacks identified in the prior art above.

In a first aspect, the present invention provides a guide apparatus for use with a portable router, for enabling the router to rout an edge of a substantially planar workpiece, the router having a base and a router bit extending from the base, the guide apparatus comprising: a main body for receiving a router base and including an opening for the router bit to extend therethrough; a reference member having a planar surface for abutment with the planar surface of the workpiece and including a guide edge along one edge thereof; a hinge means connecting the reference member to the main body; a securing means for securing the reference member to the main body at a desired angle; and a guide bar securable relative to the workpiece and providing a first guide surface for abutting the guide edge of the reference member, whereby in use with the router mounted on the main body, the router bit is guided along the edge of the workpiece. The guide apparatus can be considered as a combination of an angle guide and a guide bar, the angle guide comprising all of the elements other than the guide bar.

Preferably, the guide bar includes a rabbet along one side thereof, the rabbet providing a horizoital guide surface for abutting a top surface of the reference member to maintain the reference member adjacent to the planar surface of the workpiece.

More preferably, the reference member includes a reference bar mounted adjacent to said one edge thereof, wherein the guide edge is provided by the reference bar which, in use, abuts a surface of the guide bar.

The securing means comprises at least one plate secured to one of the reference member and the main body, and includes an arc-slot centered on the axis of the hinge means, to secure a first end of the reference member relative to the main body.

More preferably, the securing means includes a second plate secured to one of the reference member and the main body and includes an arc-slot centered on the axis of the hinge means, to secure a second end of the reference member relative to the main body at a second point.

In the preferred embodiment, the securing means comprises a pair of generally quadrant-shaped securing plates, each secured to and extending upwardly from opposite sides of the reference member and each including an arc-shaped slot centered on the axis of the hinge means, and quadrant screw knobs engaging threaded bores of the main body and extending through the arc-shaped slots In a preferred variant of the present invention, the main body comprises: a tilting frame to which the hinge means is attached and, a central cradle assembly, on which the router base is mounted, the central cradle assembly being slidably mounted with respect to the tilting frame for adjusting the relative position of the router bit, and second securing means for securing the cradle assembly in a desired position relative to the tilting frame.

Conveniently, the central cradle assembly comprises: (i) a platform having an opening for the router bit; and (ii) a plurality of holding blocks attached to the top of the platform, the holding blocks providing curved surfaces defining a cradle for receiving the router base.

Preferably, the tilting frame comprises two side members and two longitudinal members extending between and joining the side members, and wherein the central cradle assembly includes side wings overlapping the side members of the tilting frame, wherein bores are provided in one of the side wings and the side members and slots are provided in the other of the side wings and the side wing members, with the side wings and side members comprising pairs and each side wing and side member pair having one slot and one hole, and second screw members extending through the slots into the bores and provided with second screw knobs for actuation thereof, to clamp the side wings and side members together, for securing the central cradle assembly in position.

In another aspect, the present invention provides a method of using a portable router for routing a workpiece, said router having a base and a router bit extendable through said base, the method comprising the steps of: (i) providing a main body for receiving said router base therein, said main body having an opening for said router bit; (ii) providing a reference member rotatably hinged to the main body and including a guide edge along one edge thereof; (iii) providing main body securing means for adjustably securing the main body relative to the reference member; (iv) providing a guide bar having a guide surface; (v) mounting the guide bar on the workpiece in a desired position relative to an edge of the workpiece; (vi) mounting the router onto the main body, fitting a selected router bit into the router, and securing the main body at a desired angle to the reference member with the securing means; (vii) locating the reference member on tie workpiece with the guide edge abutting the guide surface of the guide bar and the top surface of the reference member abutting the horizontal guide surface of the guide bar; and (viii) operating the router and traversing the reference member across the workpiece while maintaining the guide edge in contact with the guide surface, to cut a desired profile along the workpiece.

Preferably, the method further includes the steps of: (a) providing a pair of end holding clamp, units, each having a unit body and a spike assembly having at least one press-fit spike projecting from one end of the unit body; (b) driving said press-fit spikes into opposite ends of the workpiece so as to hold said workpiece; and (c) clamping said end holding clamp units onto a table to support the workpiece for routing.

In accordance with a further aspect of the present invention, there is provided a guide apparatus for use with a portable router, for enabling the router to rout an edge of a substantially planar workpiece, the router having a base and a router bit extending from the base, the guide apparatus comprising:

a reference member having a planar surface for abutment with the planar surface of the workpiece and including a guide edge on one edge thereof, and an opening for the router bit to extend therethrough, the reference member being configured to receive and locate the router base; and a guide bar securable relative to the workpiece, and providing a first guide surface for abutting the guide edge, and a second guide surface for abutting the top surface of the reference member, whereby in use with the router mounted on the reference member, the router bit is guided along the edge of the workpiece.

This aspect of the present invention also provides a corresponding method of using a portable router for routing a workpiece, said router having a base and a router bit extendable through said base, the method comprising the steps of:

(1) providing a reference member including a guide edge along one edge thereof and an opening for the router bit;

(2) locating the router base on the reference member;

(3) providing a guide bar having a first guide surface for abutting the guide edge, and a second guide surface for abutting the top surface of the reference member, and securing the guide bar relative to the workpiece; and (4) maintaining the reference member in abutment with the workpiece and the guide edges thereof in contact with the guide surfaces of the guide bar, and traversing the reference member and the router across the workpiece, whereby the router bit routs an edge of the workpiece.

Appropriate features from the first mentioned aspect of the invention can be incorporated in the apparatus and method just defined.

For the purpose of discussion in this patent specification, the preferred embodiment is generally referred to as an "angle guide".

BRIEF DESCRIPTION OF THE DRAWINGS

FIGS. 9A–9C show a top view, front view, and side view, respectively, of the guide bar;

FIGS. 14–16 show a top view, front view, and end view, respectively, of a complete guide bar assembly;

FIG. 17 shows an end cross-sectional view taken along the line VII—VII indicated in FIG. 15;

FIGS. 18A–18C show a top view, side view, and end view, respectively, of a typical guide bar spacer;

FIGS. 21 and 22 show a top view and front view, respectively, of the guide bar setup in FIG. 20;

DETAILED DESCRIPTION OF THE INVENTION

Figure 1A:
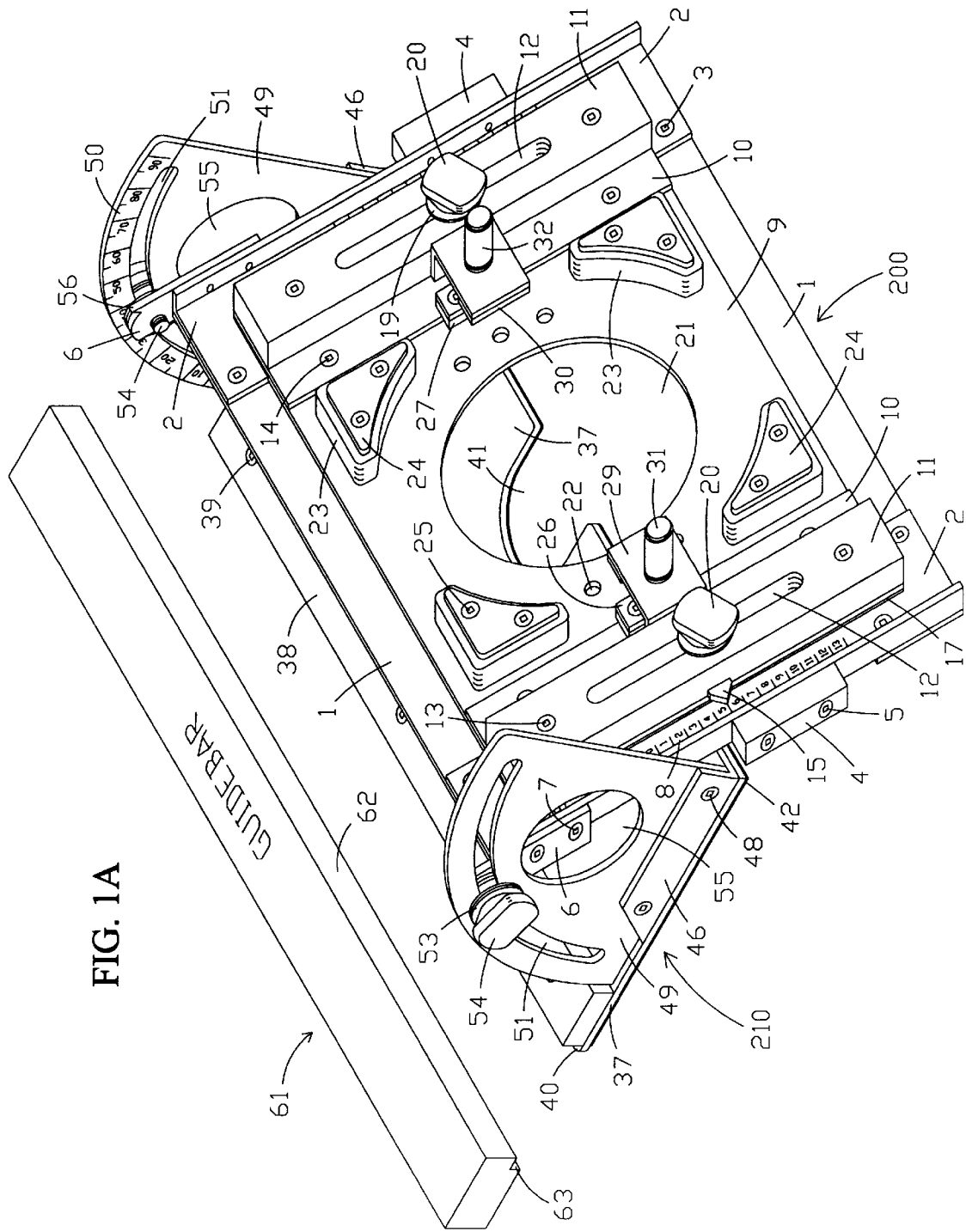
FIG. 1A shows an isometric view of a preferred embodiment of angle guide and guide bar of the present invention.
Figure 1B:
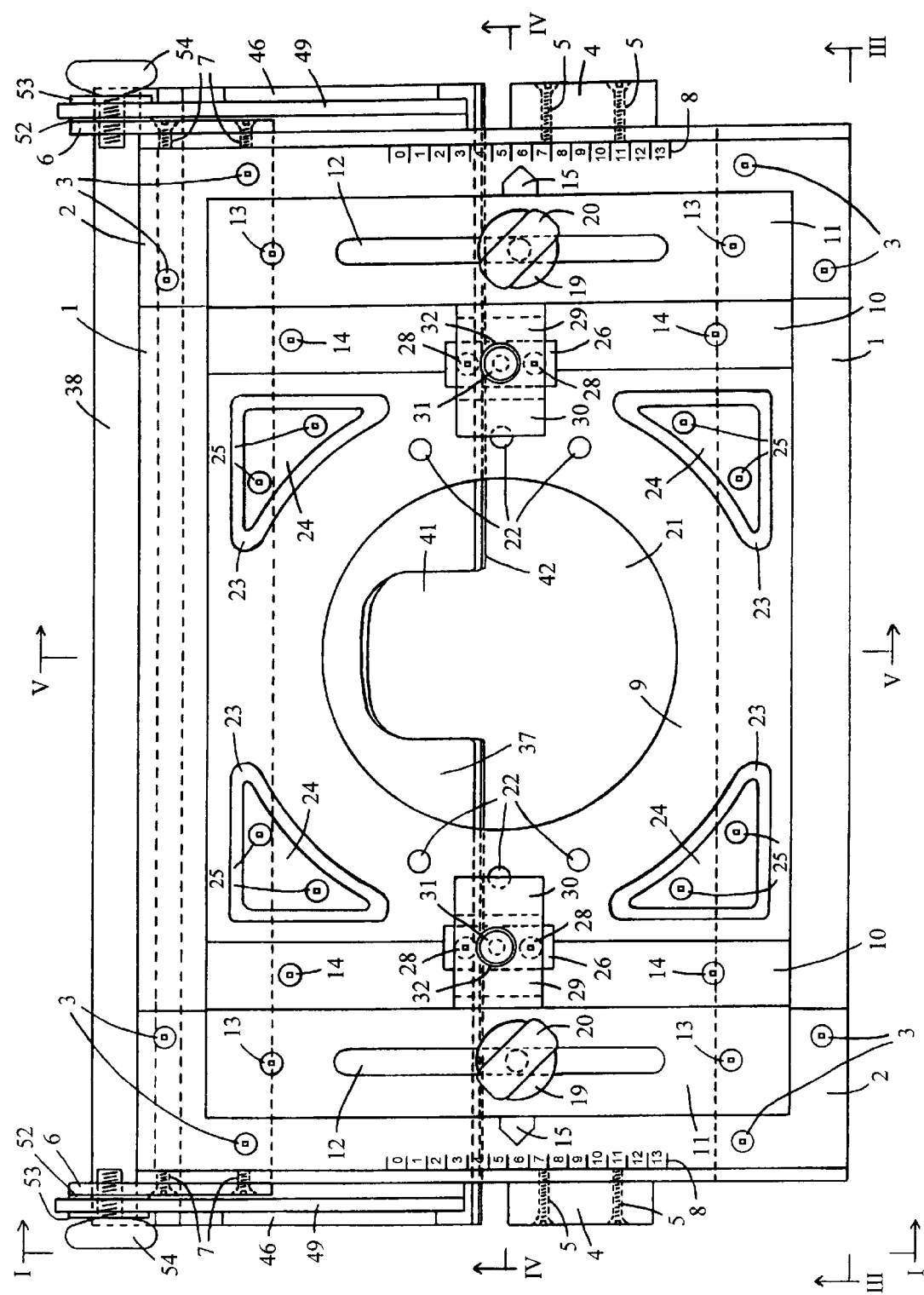
FIG. 1B shows a top view of the angle guide of FIG. 1A as viewed along line II—II of FIG. 1C.
Figure 1C:
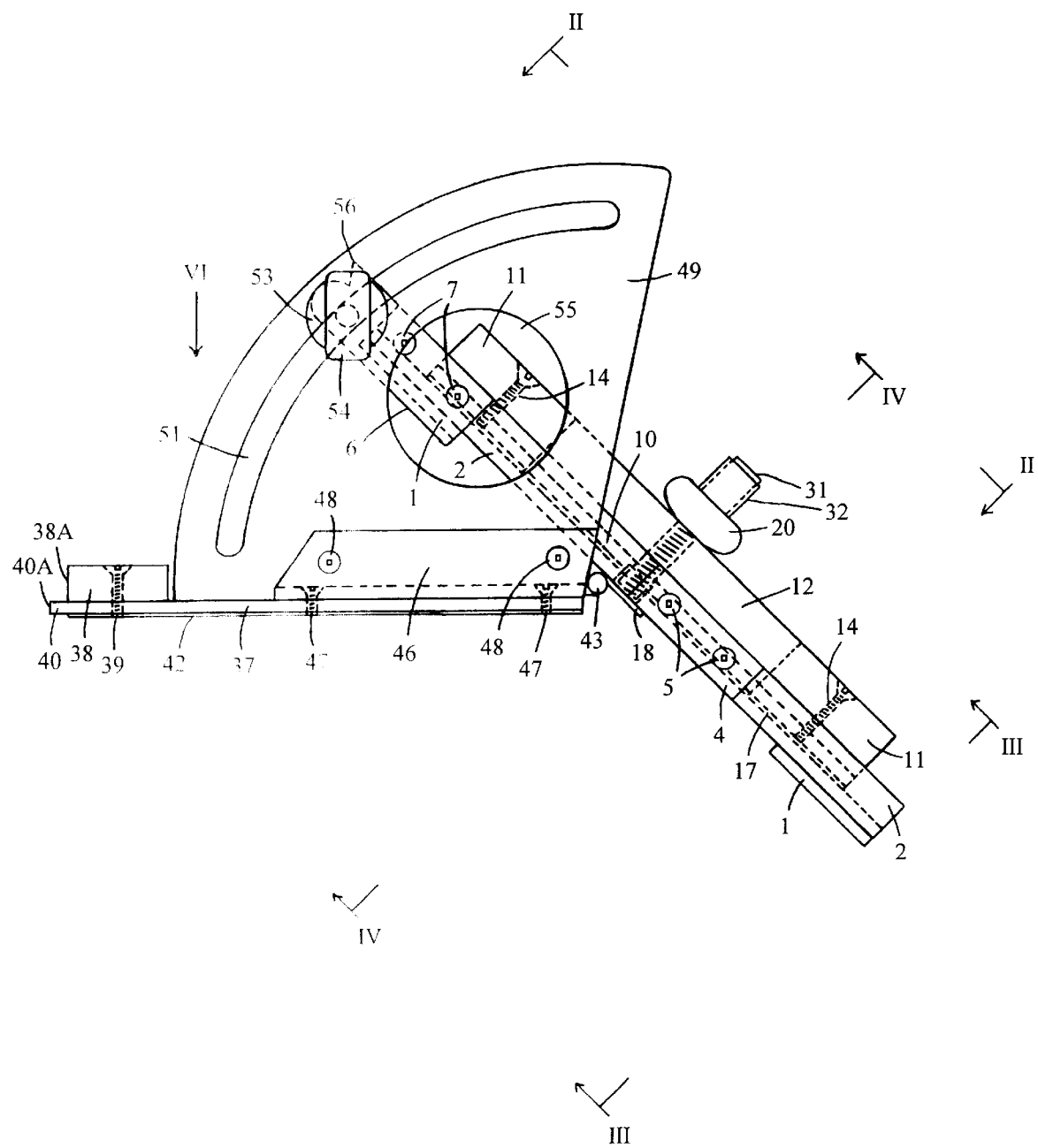
FIG. 1C shows a side view of the angle guide of FIG. 1A, as viewed from position I—I indicated in FIG. 1B.

FIGS. 1A and 1C show the preferred embodiment of the guide apparatus, also referred to as an angle guide, having a main body 200 for receiving a router base and including an opening 21 which allows a router bit to access a workpiece. When a router is mounted onto the main body 200 the router and angle guide operate as an integral unit. The angle guide further includes a reference member 210 having a planar surface and which is hinged at one edge to the main body by a hinge means (hidden from view in FIG. 1A but shown in FIG. 1C). The reference member 210 rests on top of a workpiece having a planar surface. The reference member 210 has a guide edge 38A, 40A (FIG. 1C) opposite the hinged edge, which guides the reference member 210 along a guide bar 61 shown in FIG. 1A. The main body 200 and the reference member 210 can be rotated relative to each other, about the hinge means, and a desired angle formed between the main body 200 and the reference member 210 may be set by an adjustable securing means as shown in FIGS. 1A and 1C. The guide bar 61 is secured relative to a workpiece (not shown) and provides a first guide surface 62 for abutting the guide edge 38A of the reference member, to guide the router bit of the router mounted on the main body, along the edge of the workpiece at the desired angle. Alternatively, the substantially vertical surface formed by rabbet 63 can provide the first guide surface for abutting an alternative guide edge 40A (the side edge of lip 40), as discussed further below.

In the preferred embodiment, the main body 200 comprises a rectangular tilting frame and a central cradle assembly 9 which is secured to the top of the rectangular tilting frame. The tilting frame comprises two side members 2 which are fastened onto two longitudinal members 1 by means of flat-headed machine screw 3. Located on the outside of each side member 2 is an end stop buffer 4, which is fastened onto each side member 2 by means of flat-headed machine screws 5. The function of the end stop buffer 4, which is fastened into each side member 2, is to ensure that the mid-section of each side of the main body 200 will be on the same vertical plane as each side of the reference member 210. End stops clamped onto the workpiece or on the end holding clamp units may not always be in a suitable location to properly intercept the reference member 210. This is most likely to happen when routing smaller angles onto the workpiece because the guide bar 61 is set farther back on the workpiece. In this case the end stop buffer 4 would then act in place of the reference member 210, and it would be intercepted by the end stop. The central cradle assembly consists primarily of a platform section 9 which has an opening 21 cut out of it. The platform section 9 is fastened onto two side wings 10 by means of flat-headed machine screws 14. Mounted on top of the two side wings 10 are two side wing blocks 11 which are fastened down to the two side wings 10 by means of flat-headed machine screws 13. Thus, the platform section 9, the two side wings 10, and the two side wing blocks 11 form an integral unit. Located in each side wing block 1 is a long slot 12 and corresponding slots are cut into each of the slide wings 10. Glued onto the underside of each side wing 10, in the area that extends beyond the platform section 9, is a layer of soft plastic 17 which acts as a bearing surface for the central cradle assembly on the tilting frame. The distance between the two side members 2 is such that the platform section 9 will fit in close tolerance between them, so that the two side members act as guides during any movement of the central cradle assembly within the tilting frame. The central cradle assembly is fastened to the tilting flame by fastening means which can slide along the long slots 12 in each of the side wing blocks 11. In the preferred embodiment, the fastening means comprises washers 19, screw knobs 20, and flanged T-nuts 18 (shown in FIG. 1C). Thus, the central cradle assembly can slide freely relative to the tilting frame along the length of the slots 12 until the two screw knobs 20 are tightened. To help position the cradle assembly relative to the rectangular tilting frame, pointers 15 are fastened to the sides of the cradle assembly and point to calibrations 8 which are located on each side member 2 of the tilting frame (FIG. 1A). The relative adjustment enables the router bit to be positioned anywhere across the full width of the bevel or mitre during routing.

Still referring to FIGS. 1A–1C, the reference member 210 includes a reference plate 37, to ensure the hinge axis is at the desired location. Located at either side of the reference plate 37 is a quadrant-shaped securing plate 49 with a large circular hole 55 in it, each securing plate 49 being attached to the reference plate 37 by means of a bracket 46. Each bracket 46 is fastened onto each quadrant-shaped securing plate 49 by means of flat-headed machine screws 48. The brackets 46 are also fastened onto the reference plate 37 by means of flat-headed machine screws 47. Alternatively, each quadrant-shaped securing plate 49 can be formed by bending a flat plate having a substantially rectangular area with two quadrant shaped wings at the sides. This would avoid the need for bracket 46 and fasteners 47, 48.

Figure 2:
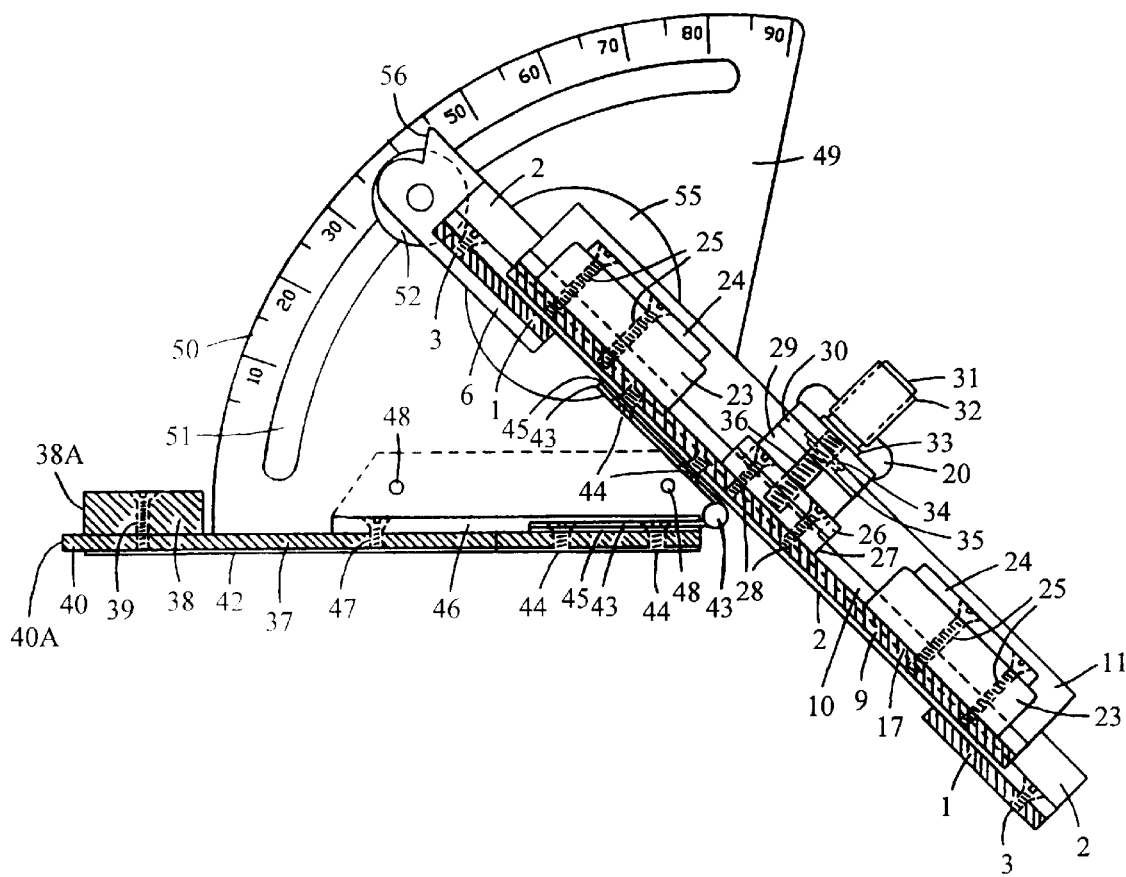
FIG. 2 shows a cross-sectional side view taken along the line V—V indicated in FIG. 1B.

Now referring to FIG. 2, the main body is connected to the reference plate 37 by means of two hinges 43. The hinges 43 are fastened onto the undersides of the two side members 2 and onto the top surface of the reference plate 37 by means of flat-headed machine screws 44. Clearance spacers 45 are inserted between each hinge 43 and each side member 2 as well as between each hinge 43 and the reference plate 37, to ensure the hinge axis is at the desired location.

Still referring to FIGS. 1A–1C and 2, attached to the rear end on each side of the main body 200 is an angle-setting bracket 6, which is fastened to each side member 2 by means of flat-headed machine screws 7. Each angle-setting bracket 6 receives a screw attached to a screw knob 54 which is inserted through an arc-shaped slot 51 in each quadrant-shaped securing plate 49. Each arc-shaped slot 51 is centered on the axis of rotation of the hinge means 43. The screw also passes through a pair of plastic faced washers 52 and 53 which sandwich each quadrant-shaped securing plate 49. Fashioned onto the end of each angle-setting bracket 6 is a calibration pointer 56 which is provided to indicate the angle that the main body is positioned at relative to the reference member, by pointing to the calibrated angles 50 inscribed on the inner side of each quadrant-shaped securing plate 49. Thus, the main body is free to tilt at any angle between about 5° to 90°, until the screw knobs 54 are tightened.

The central cradle assembly can be adjusted relative to the rectangular tilting frame while the router guide apparatus is still in place on the workpiece. This is best done by holding the upper left handle of the router with the left hand, but with one or two fingers resting on the upper edge of the rectangular frame as a control reference. Both lateral adjustment knobs 20 can then be loosened by the right hand, and the lateral adjustment made by the left hand, before tightened both knobs 20 again with the right hand. Although the angle guide will actually stay in place on the workpiece when both hands are removed, this is not wise and should always be avoided.

Still referring to FIGS. 1A–1C and 2, equally spaced around the platform section 9 are four curve-shaped holding blocks 23, each of which is fastened down to the platform section 9 by means of two flat-headed machine screws 25 in conjunction with a curve-shaped metal plate 24. Clearance holes in each of the holding blocks 23 allow the curve-shaped holding blocks 23 to have a limited amount of adjustment, so that the holding blocks 23 can fit snugly, tut not tightly, against the perimeter of the base plate of a hand-held router when it is placed within the central cradle assembly.

Figure 3:
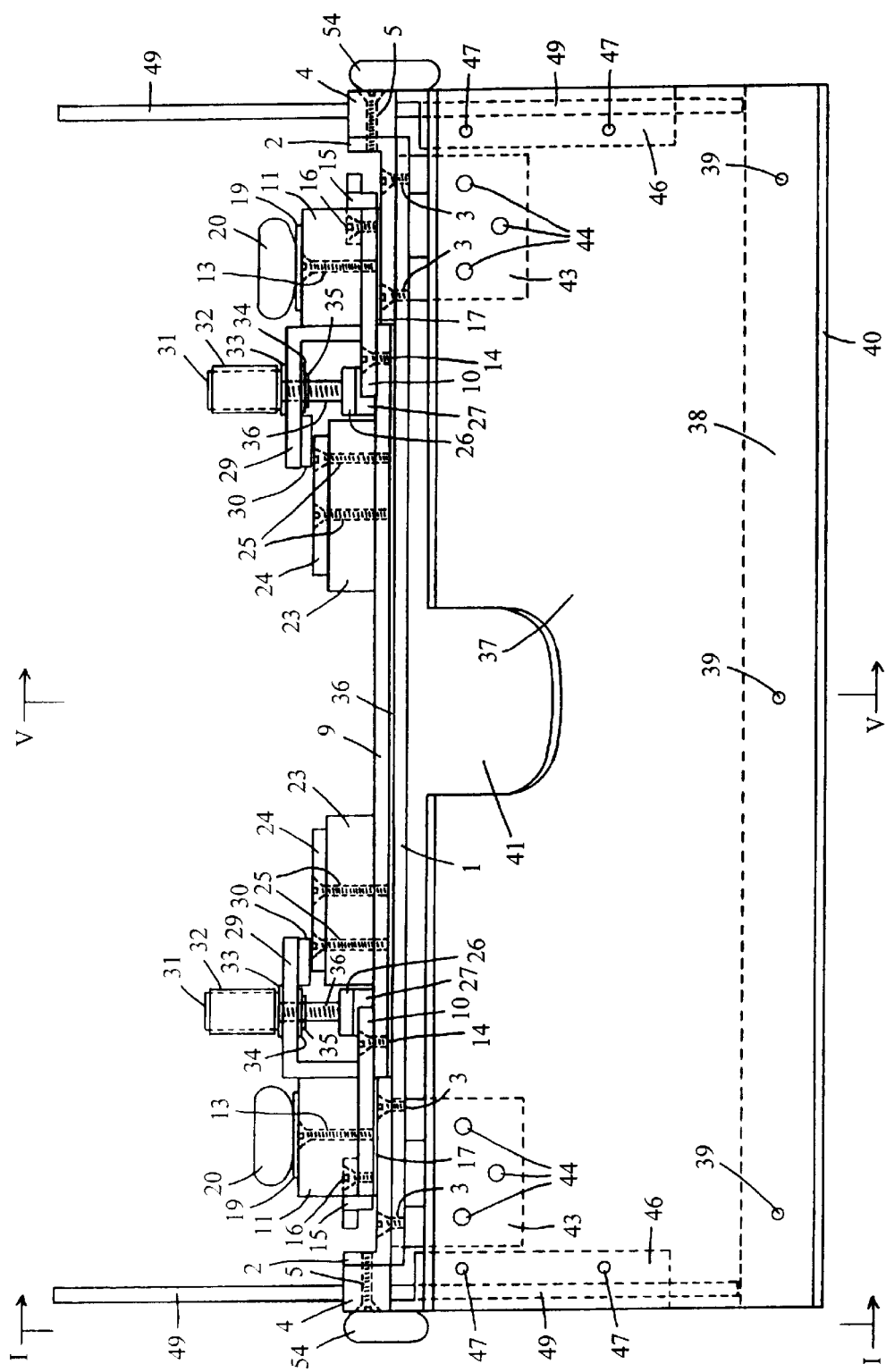
FIG. 3 shows a front view of the angle guide as viewed along line III—III indicated in FIG. 1B and 1C.

Now referring to FIG. 3, and also referring back to FIGS. 1A and 2, on each side of the platform section 9 are two holding clamps each consisting of a right-angled bracket 29 through which a threaded rod 36 passes. The threaded rod 36 is joined to a knob 31 and is held in place by washers 33 and 34 and also by circlips 35. The knob 31 and the threaded rod 36 are free to rotate, but are loosely held captive to the right-angled bracket 29. Tight fitting rubber tubing 32 is fitted over the outside of both holding clamp knobs 31 for better grip, and rubber pads 30 are glued onto the forward undersides of both right-angled bracket 29. The rubber pads 30 cushion the contact between the holding clamps and the base of the hand-held router when the latter is secured onto the central cradle assembly. The threaded rod 36, of each holding clamp, screws into a tapped hole through each clamp attachment plate 26 which is located over a clearance hole in each spacer plate 27, as well as in the platform section 9. The back end of each right-angled bracket 29 rests on the top surface on each side wing 10 and butts against each side wing block 11. This prevents the holding clamp from turning during installation and removal. Each clamp attachment plate 26 and spacer plate 27 is fastened onto the platform section 9 by means of two flat-headed machine screws 28, and both of the side wings 10 are notched out to fit around them.

The six holes 22 in the platform section 9 are to accommodate locating lugs in the base plate of the hand-held router, which will prevent rotation of the router within the four curve-shaped holding blocks 23. The removable locating lugs are described in greater detail further below.

Figure 4:
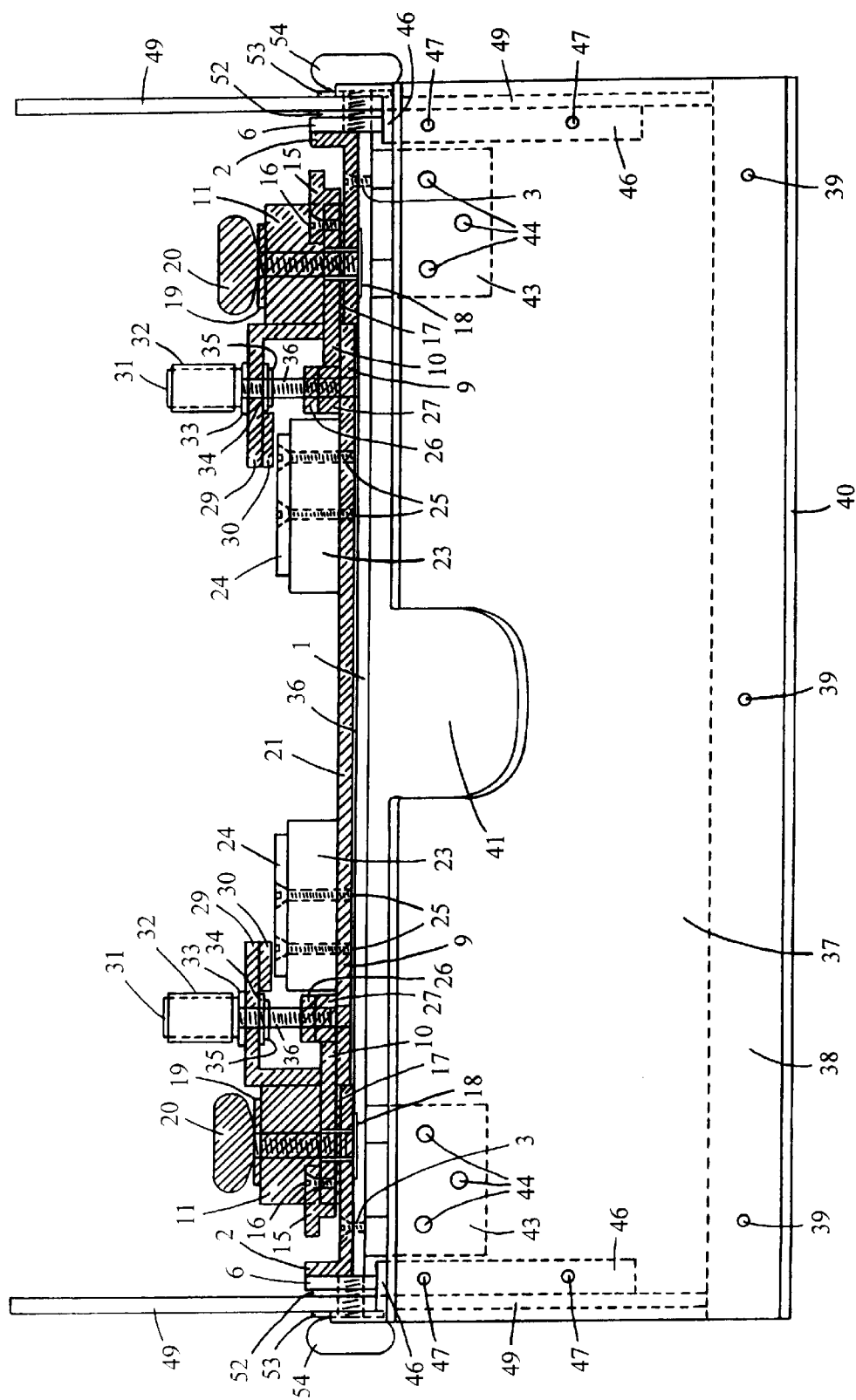
FIG. 4 shows a cross-sectional front view taken along line IV—IV in FIGS. 1B and 1C.
Figure 5:
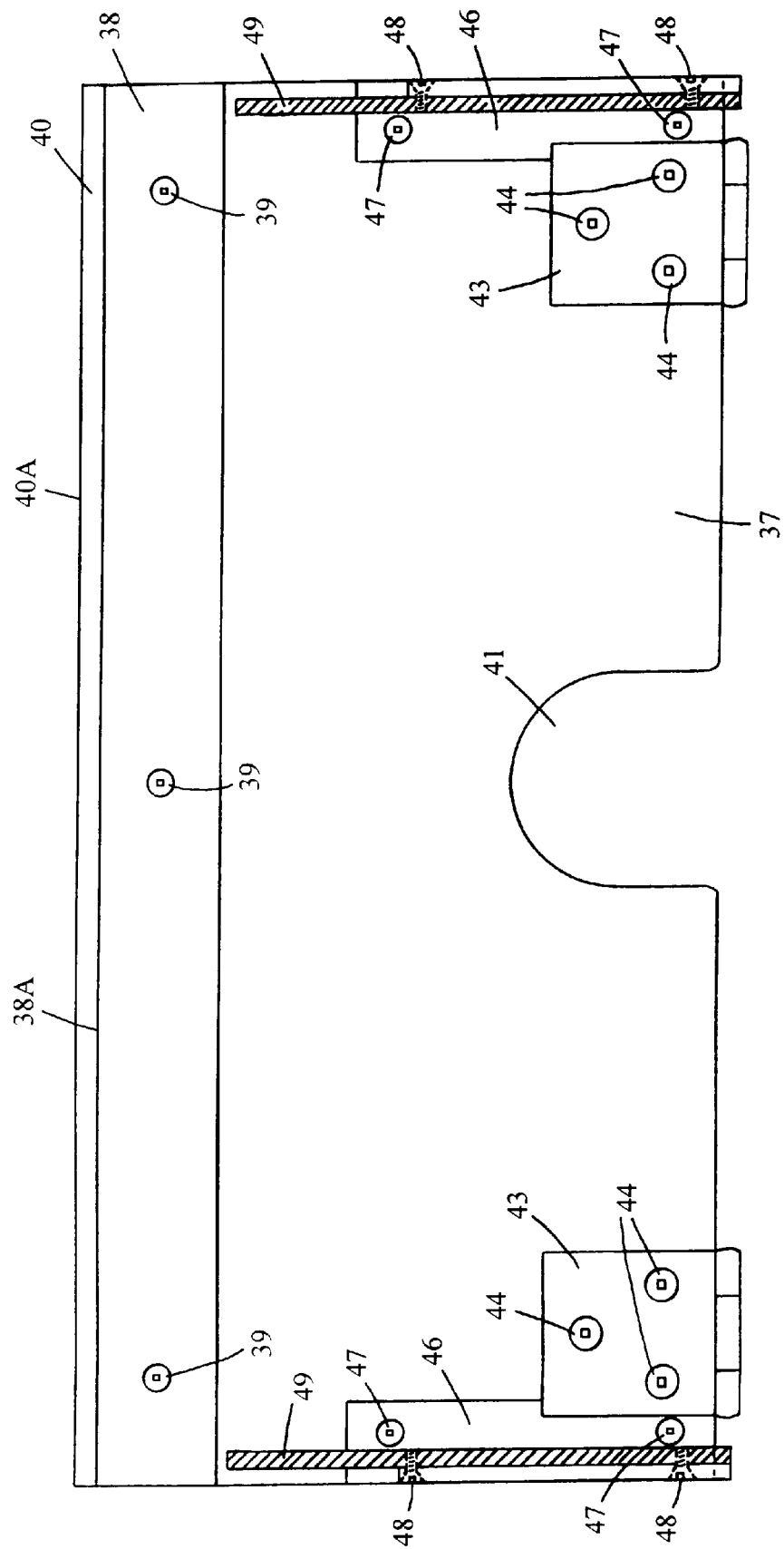
FIG. 5 shows a top view of the reference member of the angle guide as viewed from position VI indicated in FIG. 1C.

Now referring to FIGS. 4 and 5, located along the rear of the reference plate 37 is a reference bar 38 which is fastened onto the reference plate 37 by means of flat-headed machine screws 39. The reference plate 37 extends slightly past the reference bar 38 in order to form a reference lip 40, with either the lip 40 or the reference bar 38 providing a guide edge 38A, 40A. The underside of the reference plate 37 is covered with a layer of hard plastic 42 glued onto it except for the area underneath the reference lip 40 which is left uncovered as shown in FIG. 2. Furthermore, a cutout area 41 at the front of the reference of late 37 allows a clearance area for the router bit.

Figure 6:
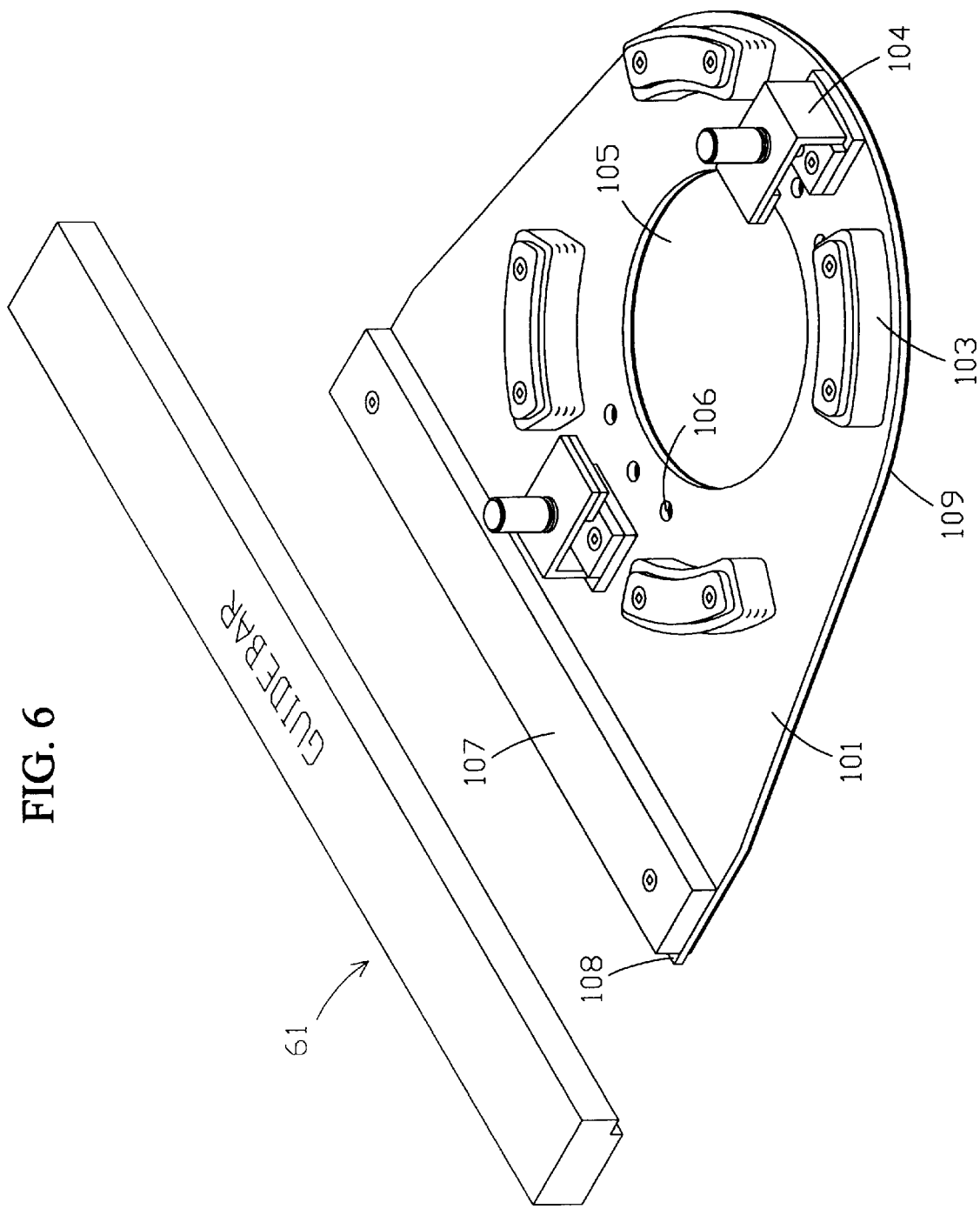
FIG. 6 shows an isometric view of a zero degree angle variant of the present invention.

FIG. 6 shows a zero degree variant of the present invention, for use when it is necessary to make a vertical cut along the edge of a workpiece. The zero degree variant comprises a substantially D-shaped plate 101 on which a hand-held router is mounted and held in place by means of four curve-shaped holding blocks 103 and holding clamps 104, similar in operation to the holding blocks and holding clamps discussed above. The opening 105 provides access for a router bit and the six holes 106 accommodate any locating lugs (discussed below) in the router baseplate.

The zero degree variant reference bar 107 and zero degree variant reference lip 108 correspond to the reference bar 38 and reference lip 40 discussed earlier. The underside of the D-shaped plate 101 is covered by a layer of hard plastic 109 glued onto it, except for the area underneath the reference lip 108.

The zero degree variant provides a very accurate and stable guide for routing rabbets or other molding shapes along the edge of a workpiece that can be of any width and of various thicknesses.

Figure 7:
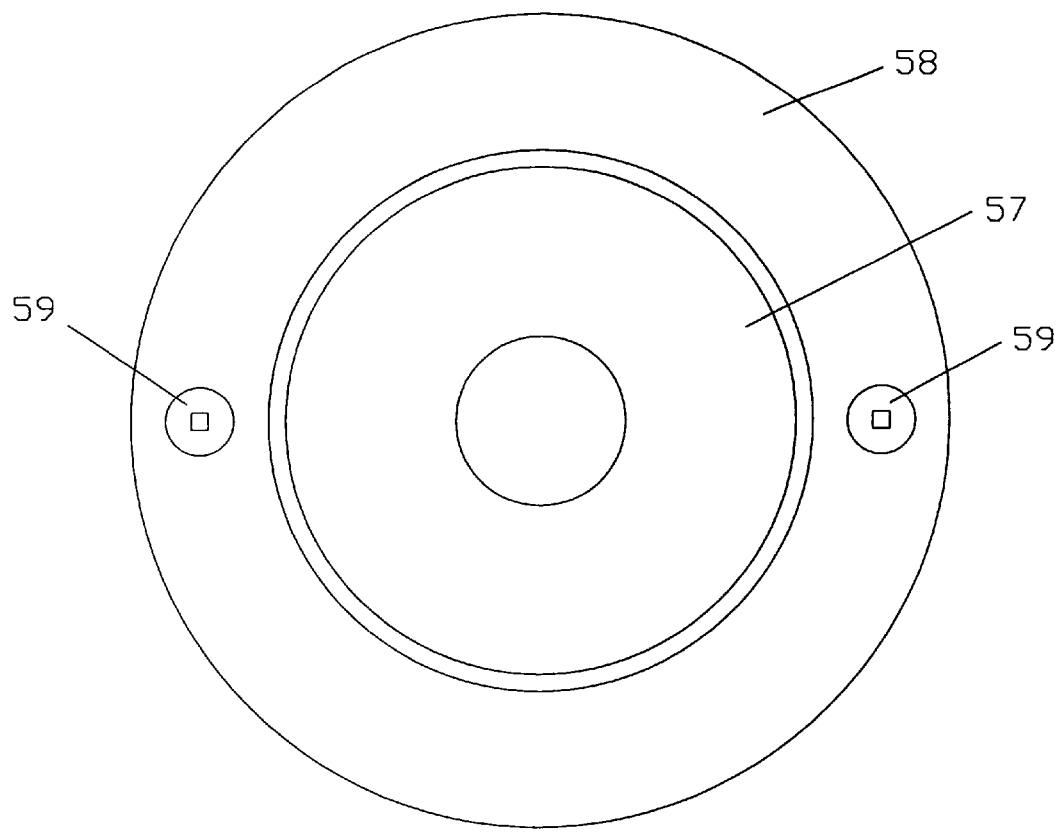
FIG. 7 shows a top view of a circular router base having two locating lugs positioned on either side of the router body.
Figure 8:
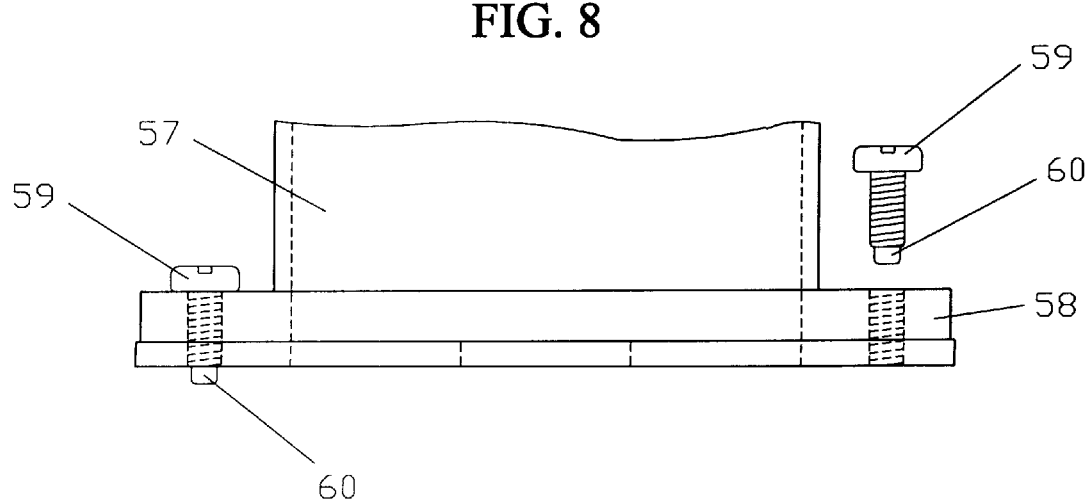
FIG. 8 shows a corresponding front view of the router base and locating lugs shown in FIG. 7.

Now referring to FIG. 7 and 8, preferably, the hand-held router 57 will have two holes drilled into its baseplate 58. These holes, which are drilled on opposite sides, should be located approximately ½" in from the outside perimeter of the baseplate 58, and then tapped with ¼" diameter threads. If only one tapped hole is possible, then that would suffice. Locating lugs 59 can then be installed into those threaded holes in the router baseplate 58 when required. A removable locating lug 59 is essentially a round-headed ¼" diameter stove bolt, of suitable length, which has been machined so that when it is fully screwed into a threaded hole in the router baseplate 58, it will cause a small 3/16" diameter chamfered pin 60 to project ⅛" below the bottom surface of the router baseplate 58 as shown in FIG. 8. These pins 60 when engaged in the appropriate holes 22 or 106, as described above, prevent rotation of the router body. Alternatively, locating lugs could instead be fastened onto the platform section 9 or the D-shaped plate 101, which would then fit into matching holes drilled into the router baseplate 58.

Shown in FIGS. 9A–9C is a basic guide bar 61 which is used to guide and control the router guide apparatus during use. The guide bar 61 is clamped onto a workpiece a specific distance away from where the required angle is to be routed. The guide bar 61 is essentially a straight edge, but with a rabbeted section 63 along the bottom of its front edge 62. The rabbeted section 63 has a substantially vertical surface 63V, and a substantially horizontal surface 63H. Either the front edge 62 or the substantially vertical surface 63V provides a first guide surface, for abutting the guide edge 38A, 40A (either the side edge of the reference bar 38, or the side edge of lip 40, respectively). The substantially horizontal surface 63H provides a second guide surface for abutting the top of the reference lip 40 so as to maintain the router guide apparatus reference member against the planar surface of the workpiece.

Figure 10:
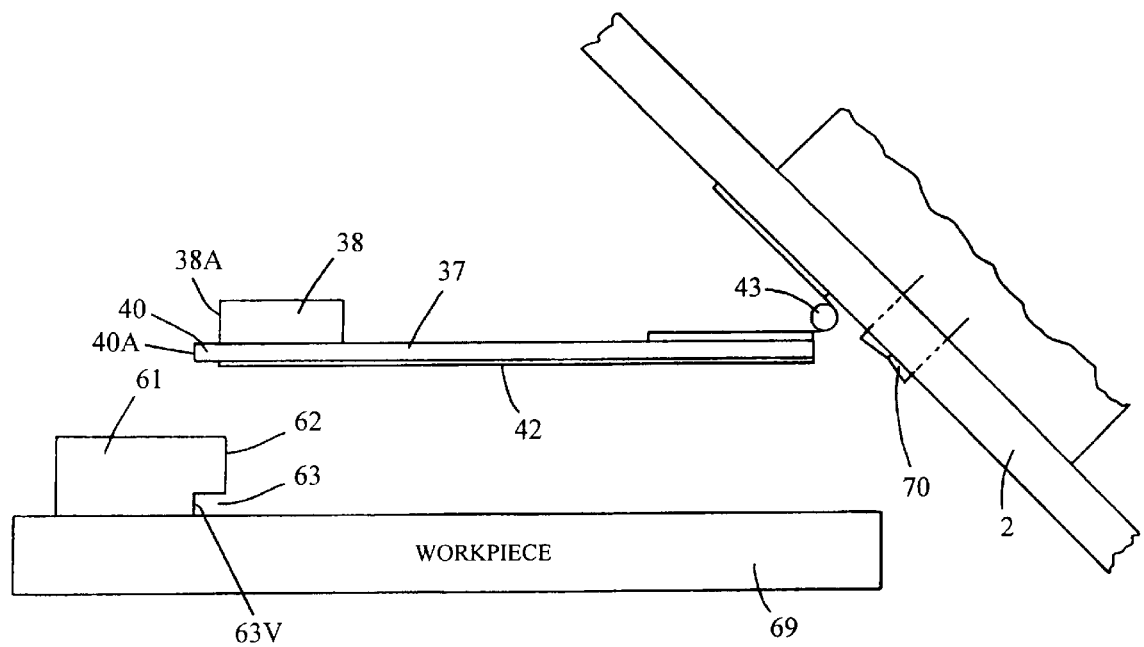
FIG. 10 shows a side view of the angle guide, guide bar, and workpiece.
Figure 11A:
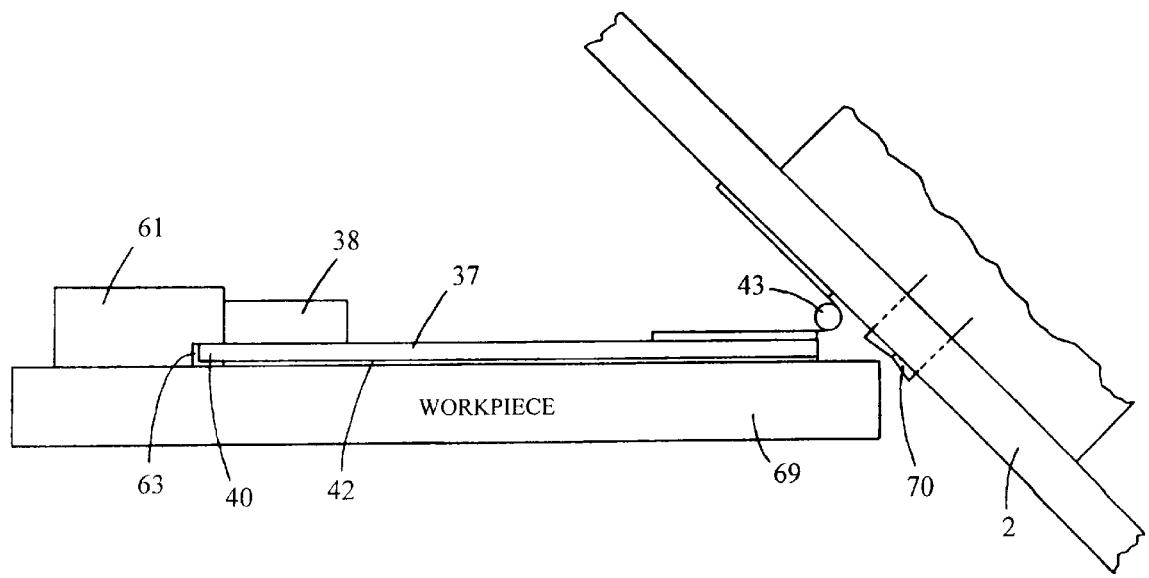
FIG. 11A shows a side view similar to FIG. 10, with the reference member resting on top of the workpiece and the reference bar abutting the guide bar.
Figure 11B:
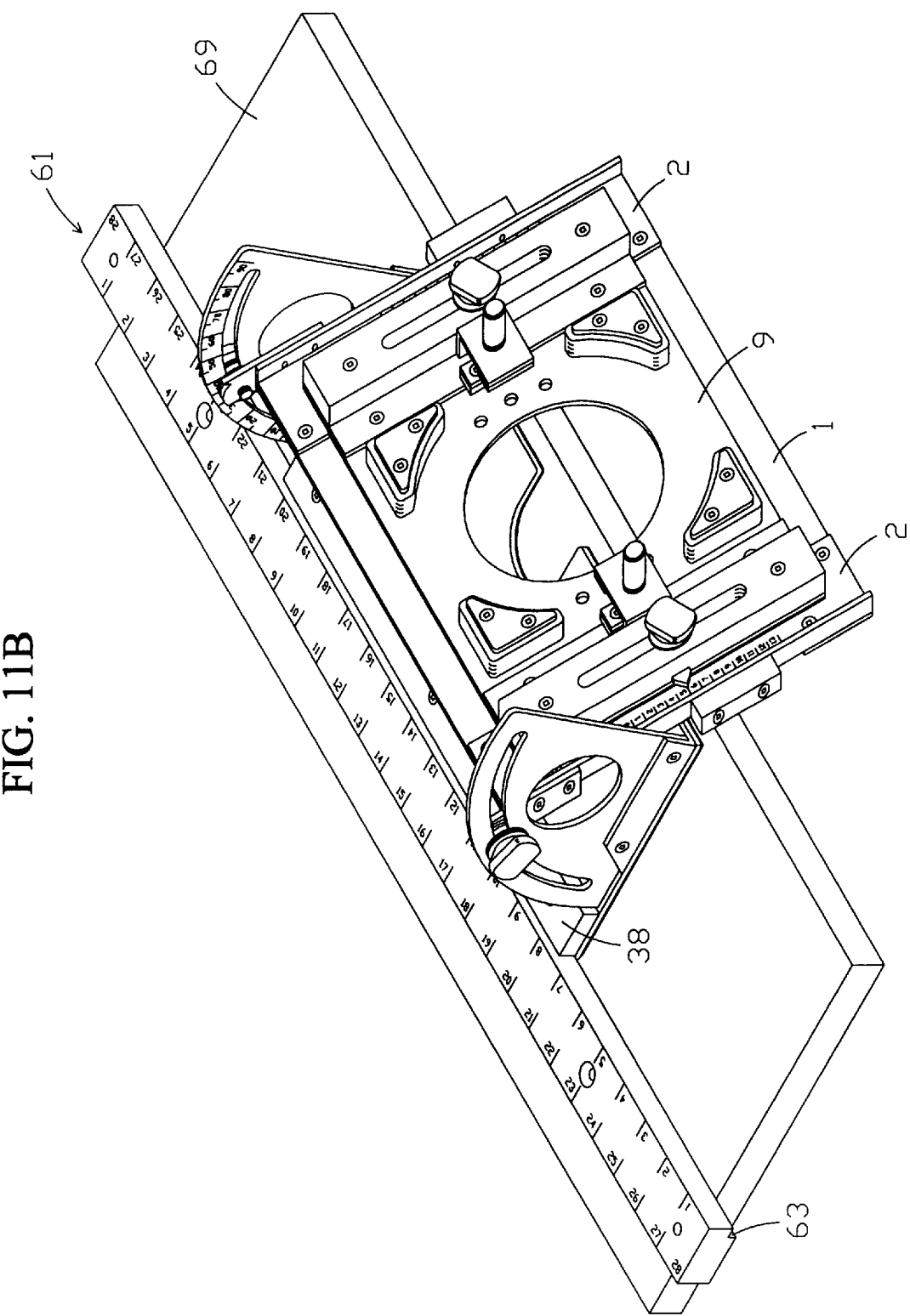
FIG. 11B shows an isometric view of the setup shown in FIG. 11A.
Figure 12A:
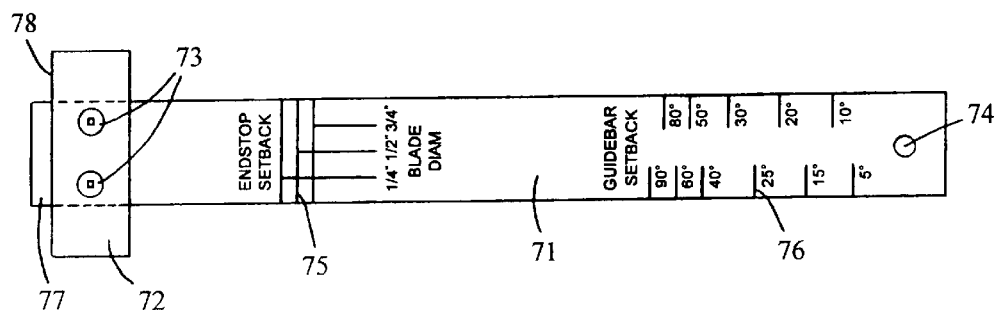
FIGS. 12A–12C show a top view, side view, and end view respectively, of a guide bar setback gauge.
Figure 12B:
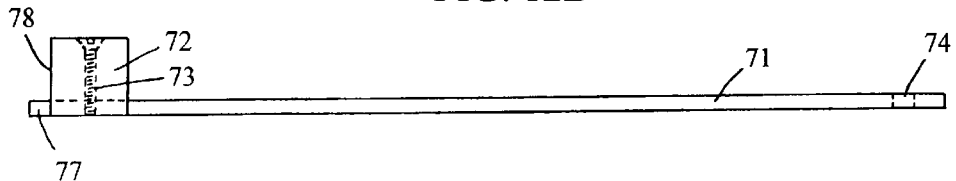
Figure 12C:
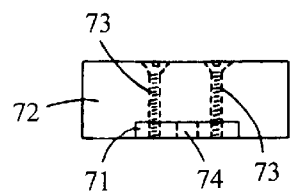
Figure 13:
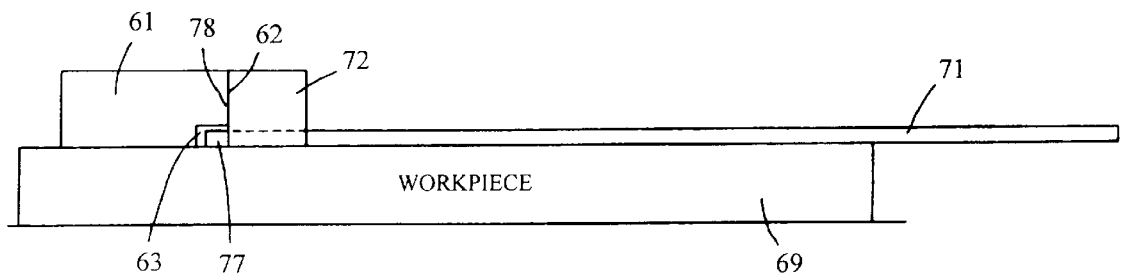
FIG. 13 shows the guide bar setback gauge of FIG. 12A–12C in use.

Referring now to FIGS. 10, 11A, and 11B, the guide bar 61 is first secured on the workpiece (positioning of the guide bar 61 is detailed below). Then, the underside of the angle guide reference plate 37 (i.e. the layer of hard plastic 42) is designed to rest on the top surface of the workpiece 69, with the reference bar 38 or the side edge of lip 40 providing a guide edge 38A, 40A butting against the front edge 62 or the substantially vertical surface 63V, respectively, of the guide bar 61. Because of a lack of the hard plastic material 42 underneath the reference lip 40, the reference member can be quickly and easily planned into the rabbeted section 63 for routing, and also just as easily be removed afterwards. When the angle guide is placed into position, the route bit 70 will be appropriately located to rout along the outer edge of the workpiece 69. The router bit 70 is adjustable as to its angle, lateral position, and depth of cut, to suit individual requirements. The specific distance that the guide bar 61 has to be set back from the working edge of the workpiece 69 will vary, depending on the angle that is required to be cut. Note that, as shown in FIG. 11A, the router is positioned to use only the end surface or tip of the router bit to rout a bevel or chamfer along the upperside edge of the workpiece, using a routerplaning action.

Now referring to FIGS. 12A–12C and 13, a special gauge to perform the task of setting the guide bar 61 back at a specific distance is shown. A gauge body 71 is attached to a reference block 72 by means of two flat-headed machine screws 73. A hole 74 is provided so that the gauge body 71 can be hung up when it is not in use. The gauge is placed on the workpiece 69 so that a back side 78 of the reference block 72 is butted against the front edge 62 of the guide bar 61 with a lip 77 projecting into the rabbeted section 63. The guide bar 61 is then moved into position until a desired angle 76, indicated on the gauge body 71, is lined up with the front working edge of the workpiece 69. The guide bar 61 is then clamped down in that position. Also provided on the gauge body 71 are end-stop calibration markings 75 for various blade sizes, to correctly position end stops when needed. In order to correctly mark the location to clamp an end stop onto a workpiece, the guide bar setback gauge is used in the reverse direction so that the hole 74 end of the gauge is placed against the point where the bevel or chamfer is to terminate. Then the appropriate location for the end stop can be marked on the workpiece as indicated by the calibration markings 75 for various blade diameters. If a bevel or mitre is required to be routed only partly along the edge of a workpiece, then end stops could be placed at the required locations, which would be set back an amount that is indicated by the markings 75.

Because the guide bar 61 has to be set back at least about 6" from the front edge of the workpiece 69 in order to accommodate the full width of the angle guide reference plate 37, it means that the basic guide bar 61 can only be used on boards and panels that are about 8" wide or wider. In order to rout angles onto the edges of boards that are less than 8" wide, a guide bar assembly will be required.

A typical guide bar assembly is shown in FIGS. 14–17. In this case, the basic guide bar 61 is mounted onto an underbase 64 which is made wider than the guide bar 61, so that a ledge 68 is formed along the rabbeted side of the guide bar 61, as shown in FIG. 16. In use, the ledge 68 provides a supporting surface for the reference plate 37 near the reference lip 40 edge. The guide bar 61 is fastened onto the underbase 64 by means of two or more flat-headed stove bolts 65, which screw into captive T-nuts 66 located in the underbase 64. The guide bar 61 is easily removed from the underbase 64 so that the guide bar 61 can be used independently when required. While the guide bar assembly can be made of any length, the longer sizes will require that both the guide bar 61 and the underbase 64 be made wider in proportion. Also shown in FIGS. 14 and 15 are holes 67 which pass through both the guide bar 61 and the underbase 64. These holes 67 may be used for hanging the guide bar assemblies when not in use, or alternatively fastening down the guide bar assembly to a bench using screws.

Now referring to FIGS. 18A–18C, used in conjunction with the guide bar assembly is a guide bar spacer 79, which has a finger hole 80 in its centre for easy handling. A guide bar spacer or a plurality of guide bar spacers 79 may be used in conjunction with a guide bar assembly so that any precise thickness (guide bar underbase thickness plus the spacer thicknesses) can be obtained when they are used in combination. A boxed set of guide bar spacers 79 would comprise matching pairs of various thicknesses that can be used in any combination for this purpose.

Figure 19:
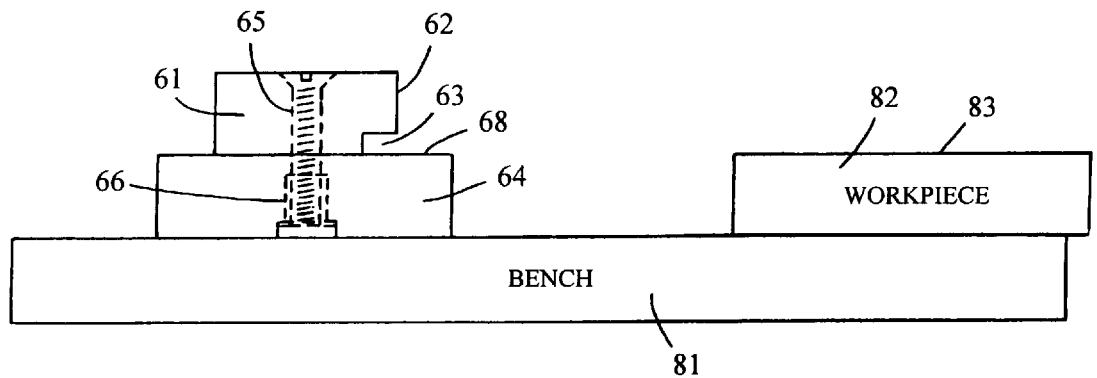
FIGS. 19 and 20 show various guide bar assembly and spacer setups for different workpiece heights.

As shown in FIG. 19, in practice, the guide bar underbase 64 substitutes for that part of the workpiece that would normally be underneath the guide bar 61, if the workpiece had been of sufficient width. In this case, the narrow workpiece 82 is exactly the same thickness as the guide bar underbase 64 so that both can be clamped down directly onto the workbench 81. Then, as is required, the top surface or ledge 68 of the guide bar underbase 64 will be exactly the same height as the top surface 83 of the workpiece 82, and conditions will be right for operating the angle guide on the narrow workpiece 82.

Figure 20:
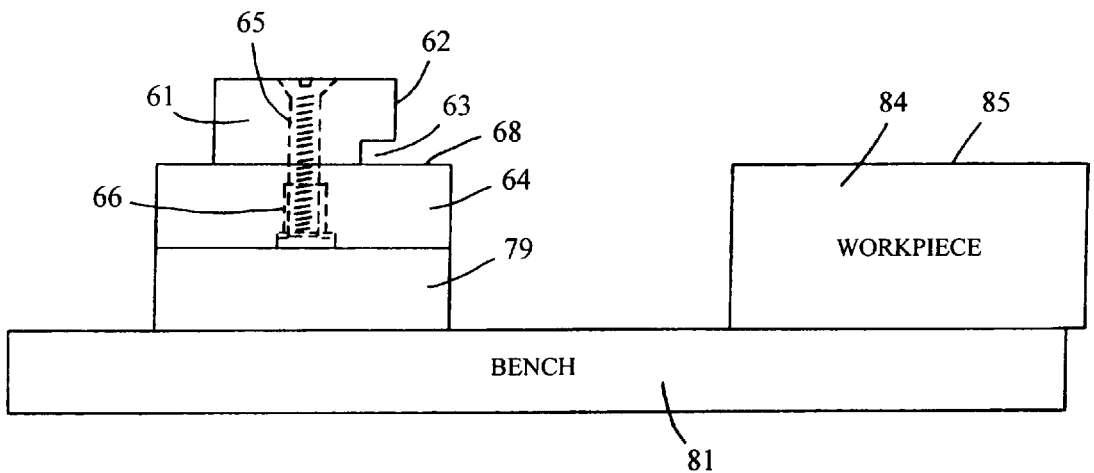

As shown in FIG. 20, if the narrow workpiece 84 is thicker than the guide bar underbase 64, then the correct combination of guide bar spacers 79 are placed in identical piles under each end of the guide bar underbase 64. This will raise the guide bar assembly by the required amount, so that the height of the top surface or ledge 68 of the guide bar underbase 64 will now be the same as the height of the top surface 85 of the thick and narrow workpiece 84. FIGS. 21 and 22 show a top view and front view, respectively, of the pair of guide bar spacers 79 placed underneath each end of the guide bar underbase 64, and lying on the workbench 81.

Figure 23:
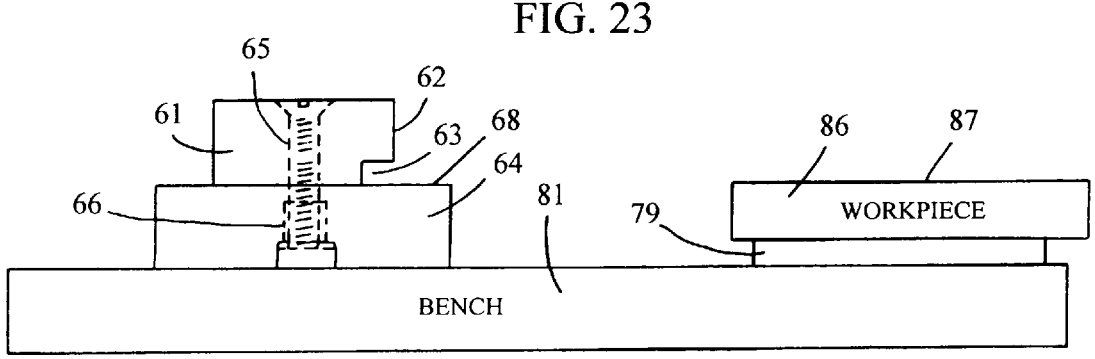
FIG. 23 shows an alternative method of setting the workpiece at the proper height using a guidebar spacer.

If the narrow workpiece 86 is thinner than the guide bar underbase 64, as shown in FIG. 23, then instead of placing suitable guide bar spacers 79 underneath the guide bar assembly, the guide bar spacers 79 are placed underneath each end of the thin narrow workpiece 86 instead. This raises the height of the top surface 87 of the thin narrow workpiece 86 so that it will be the same as the top surface or ledge 68 of the guide bar underbase 64.

One other problem that presents itself when attempting to rout bevels and mitres along the edges of boards that are less than about 8" wide, is to find a satisfactory method of securing those workpieces onto a benchtop, in a manner that will not cause any obstruction on, or around, the workpiece. While the workpiece could be nailed, screwed, or glued down onto a benchtop, a more satisfactory method that would be virtually non-marring is to use end holding clamp units. FIGS. 24, and 25A–25D, show in detail an end holding clamp unit.

A unit body 88 is recessed at one end so that a spike assembly 92 can be flush-mounted onto the unit body 88 by means of flat-headed wood screws 93. The spike assembly 92 has three press-fit spikes 94 projecting from the spike assembly 92. Each of the press-fit spikes 94 is conical in shape for maximum holding power. The top of the unit body 88 is also recessed at its centre so that the base of an end-stop bracket 89 can be flush-mounted onto the unit body 88 by means of flat-headed machine screws 90. Glued onto the forward side of each end-stop bracket 89 is a rubber buffer 91 which acts as a cushion for the angle guide during use, to prevent the router engaging the unit 88 and the router bit from being damaged by the spikes 94. Surface mounted on the front side of the unit body 88 are the two side tabs 95, which are fastened to the unit body 88 by means of flat-headed wood screws 96. Countersunk holes 98 are provided so that the end holding clamp unit can be screwed down if required.

Figure 24:
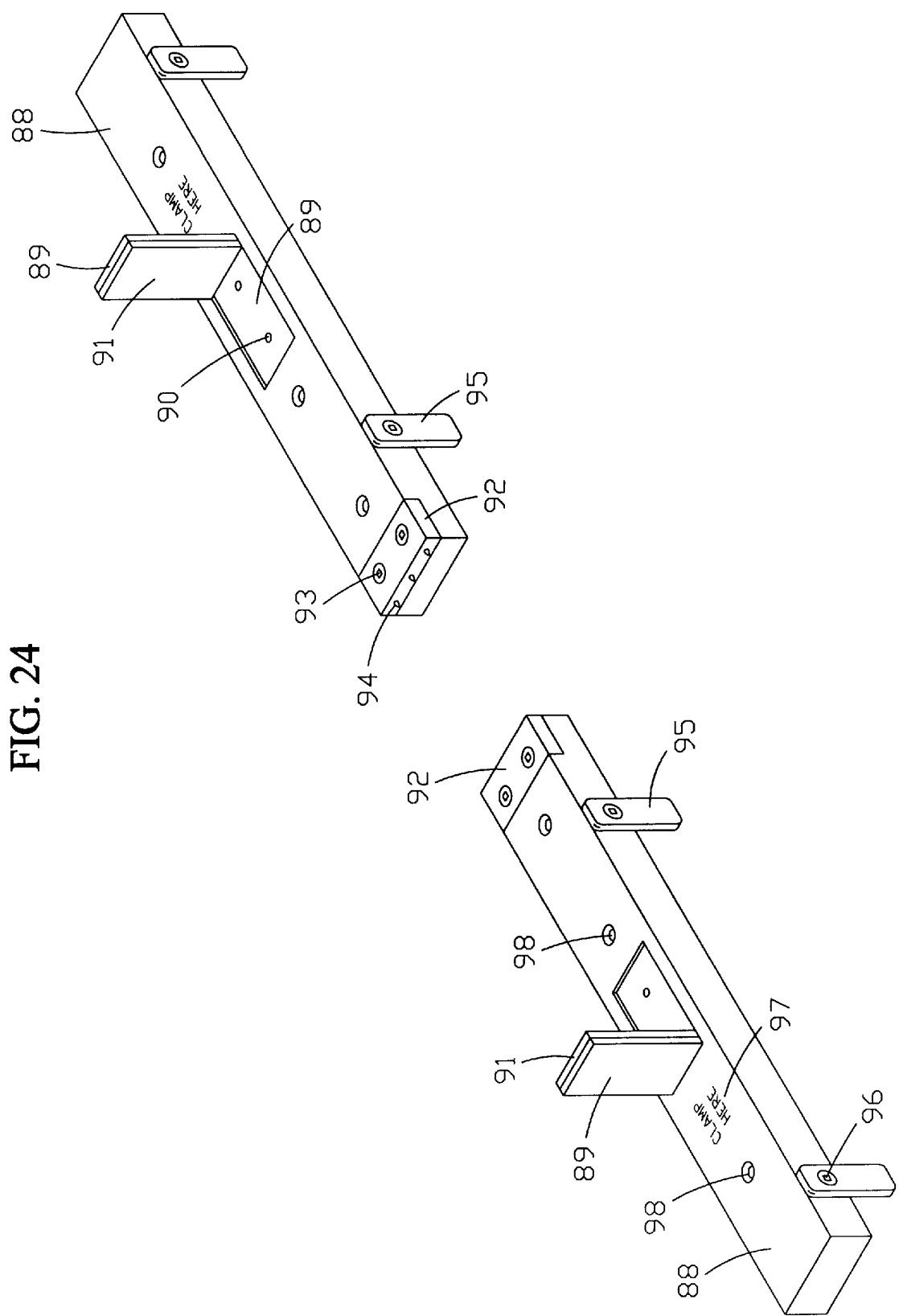
FIG. 24 shows an isometric view of two opposing end holding clamp units.
Figure 25A:
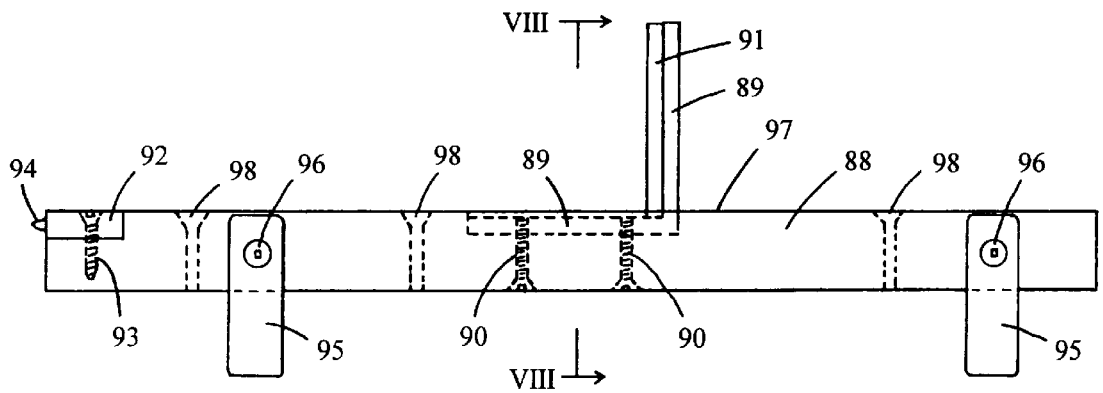
FIGS. 25A–25C show a side view, top view, and end view, respectively, of an end holding clamp unit.
Figure 25B:
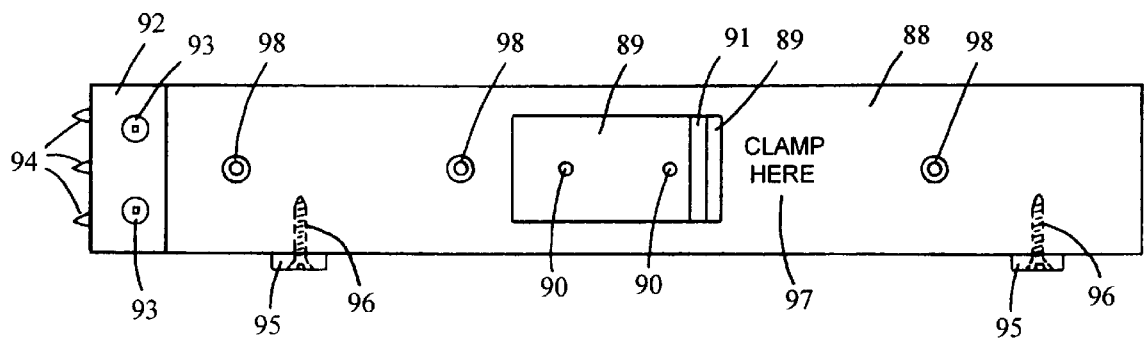
Figure 25C:
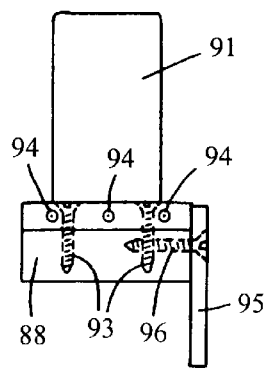
Figure 25D:
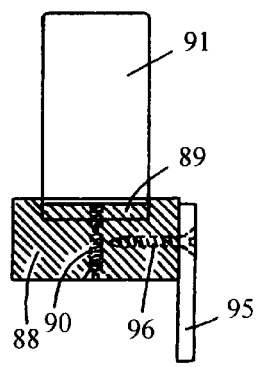
FIG. 25D shows a cross-sectional end view of the end holding clamp unit taken along the line VIII—VIII indicated in FIG. 25A.

The end holding clamp unit shown in FIGS. 25A–25D, is suitable for holding the right end of a workpiece. A left end holding clamp unit would have the side tabs 95 placed on the other side of the unit body 88. In other words, the left end holding clamp unit is a mirror image of the right end holding clamp unit as shown in FIG. 24.

Figure 26:
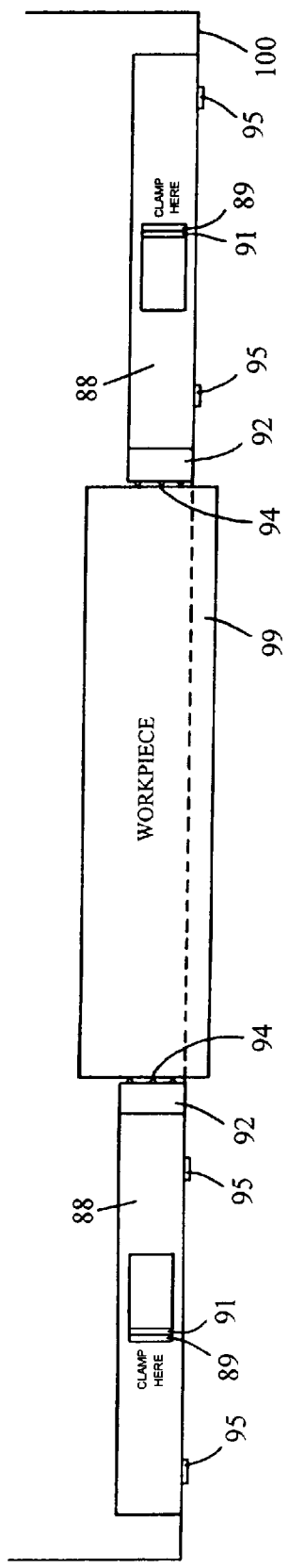
FIGS. 26 and 27 show a top view and a side view, respectively, of the end holding clamp units holding a workpiece.
Figure 27:
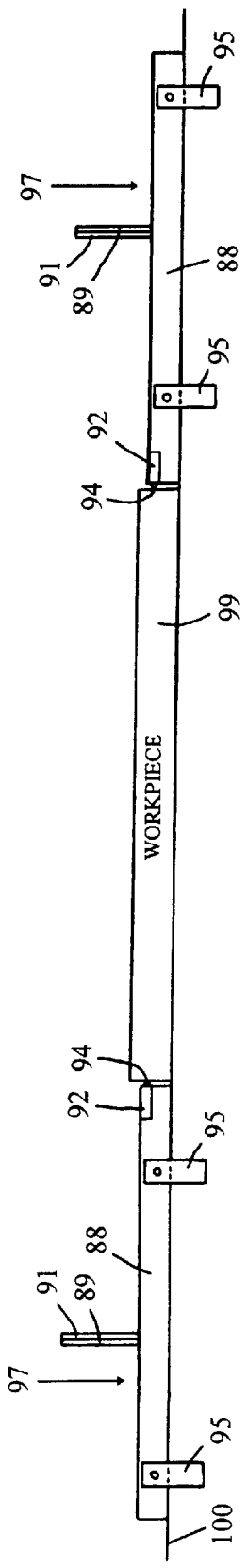

Now referring to FIGS. 26 and 27, illustrations show how the end holding clamp units would be set up and used. The end holding clamp units are placed at each end of the workpiece 99, which has its front edge overhanging the front edge of benchtop 100. The conical-shaped spikes 94 are pushed firmly into the ends of the workpiece 99, and the unit body 88 of each end holding clamp unit sits on the top surface of the benchtop 100, with the side tabs butting against the front edge of the benchtop 100. The end holding clamp units are then held in place by means of single C-clamps which are located immediately behind each end-stop bracket 89 where the words "CLAMP HERE" are inscribed, as shown by arrow 97. The purpose of the side tabs 95 is not only to locate the end holding clamp units, but also to resist any twisting action that may occur during routing. The purpose of the raised end-stop brackets 89 is to act as a safeguard to prevent the router bit from getting too close to the conical steel spikes 94. Consequently, the routed area will not quite reach the actual ends of the workpiece 99 that is being held in this manner.

Figure 28:
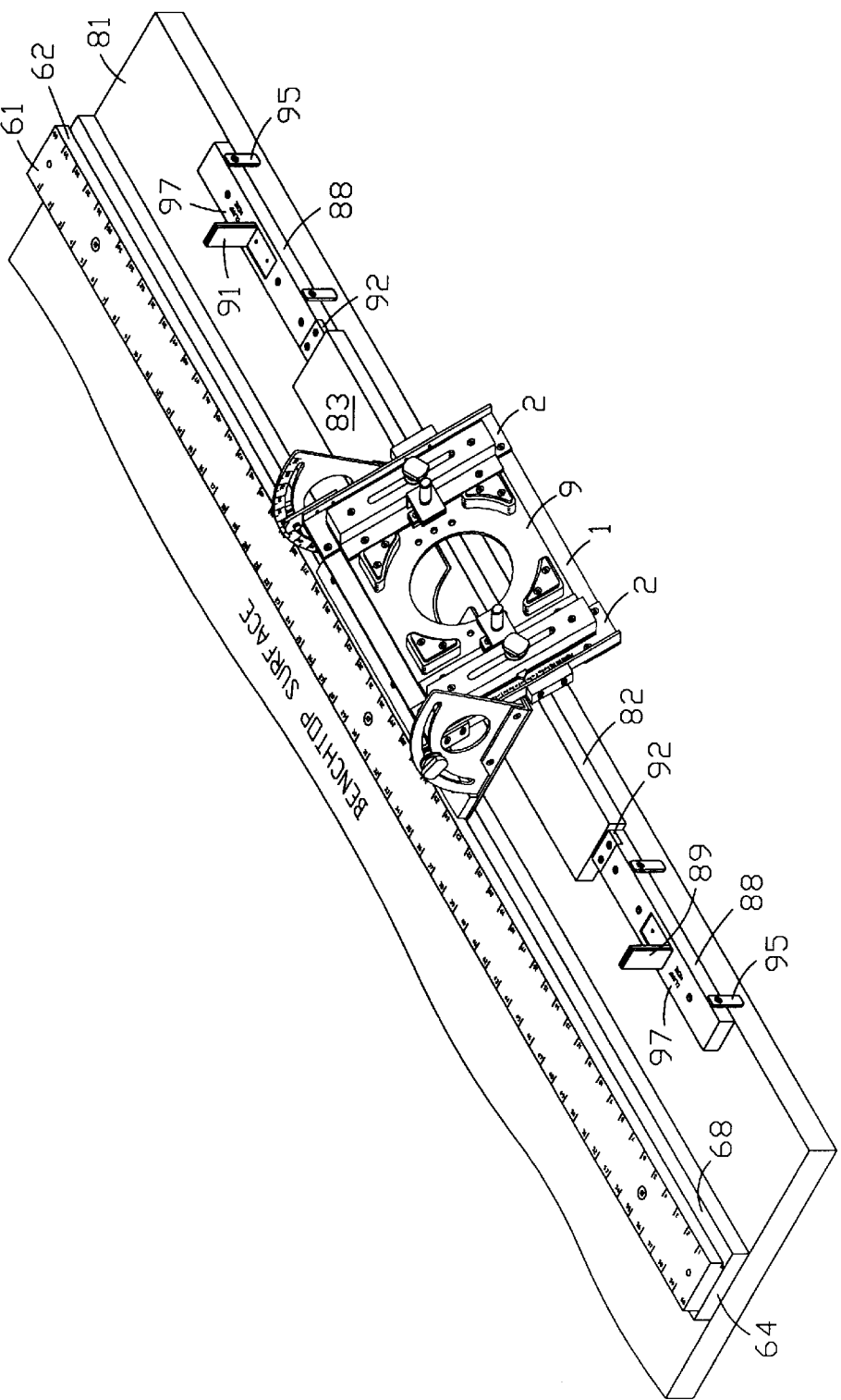
FIGS. 28–30 show isometric views of end holding clamp units holding a workpiece where the workpiece thickness is exactly ¾", more than ¾", and less than ¾", respectively.
Figure 29:
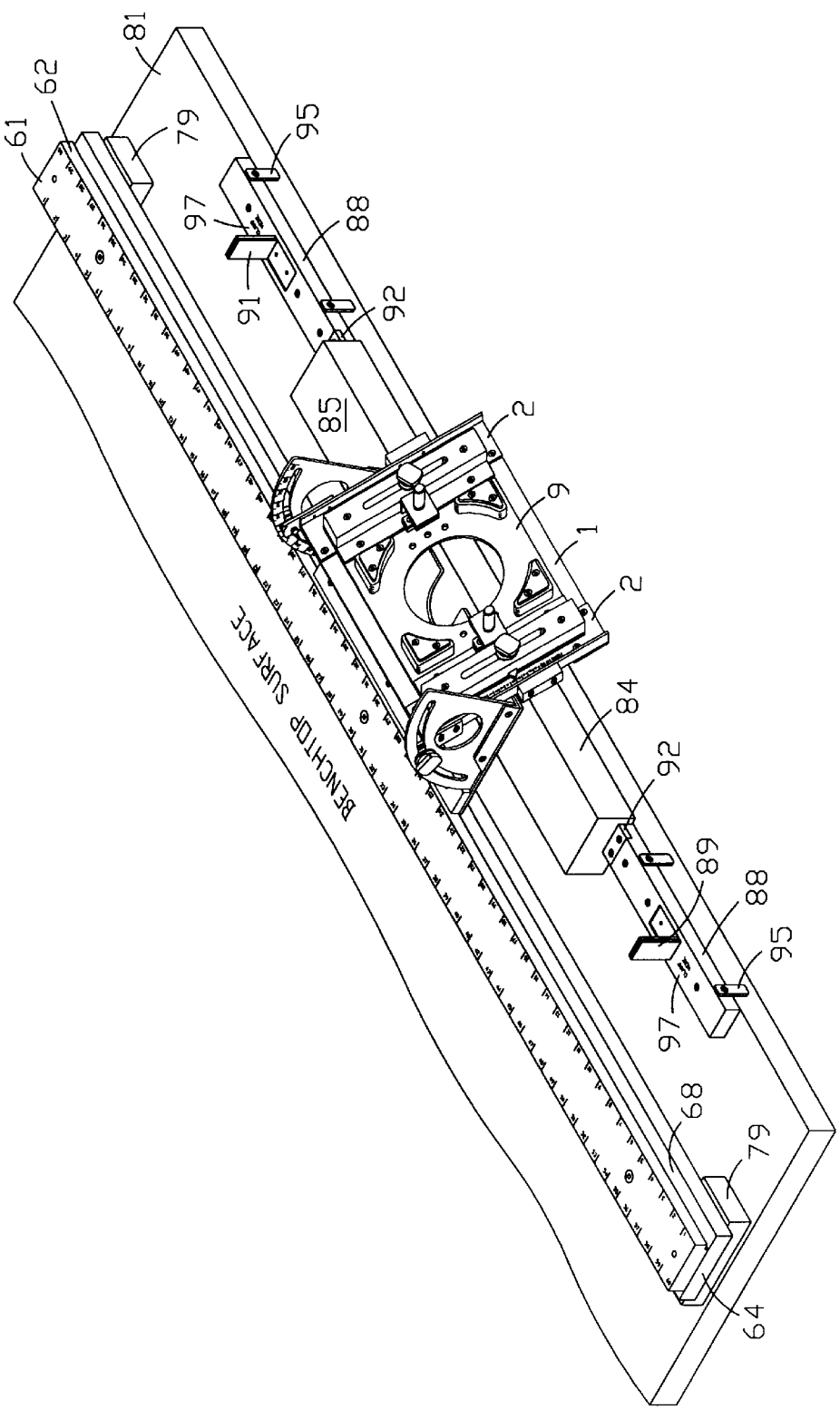
Figure 30:
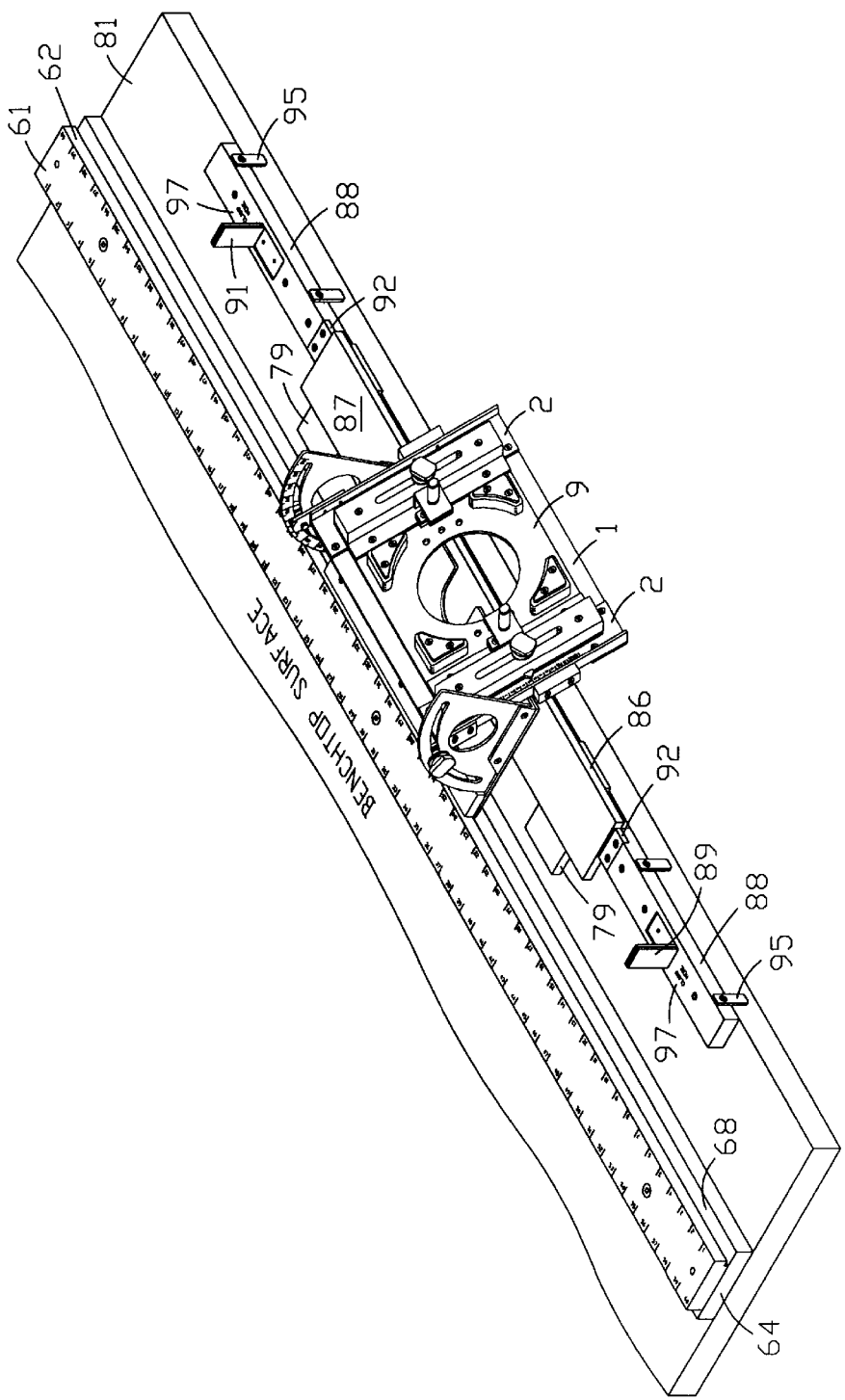

Now referring to FIGS. 28–30, a set up for routing bevels along narrow boards when the workpiece thickness is exactly ¾", more than ¾", and less than ¾", respectively, are shown. In FIG. 28, since the underbase 64 is the same thickness as the workpiece 82, no guide bar spacers are used. In FIG. 29, since the workpiece 84 is thicker than the underbase 64, a pair of guide bar spacers 79 are used to bring the guide bar 61 and underbase 64 up to a sufficient height. Finally, in FIG. 30, since the workpiece 86 is thinner than the underbase 64, a pair of guide bar spacers 79 are placed under the workpiece 86 to bring the height of the workpiece 86 level with the height of the underbase 64.

In practice, the angle guide with the router attached forms one integral unit. This unit is held and controlled by means of the two handles of the router. The router is best oriented in the cradle assembly with one handle being upper left, and the other being at the lower right. The router guide apparatus should be placed in position against the guide bar, with the reference lip 40 projecting into the rabbeted section 63 of the guide bar 61 during use. This will maintain the router guide apparatus reference member adjacent the planar surface of the workpiece.

Normally, the router should be turned on prior to any contact of the router bit with the workpiece. While any size of router bit can be used in the router, in most cases a ¾" diameter blade is preferable because not only is it easier to ensure that the blade is only partly on the workpiece when making the upper and lower cuts, but a larger blade diameter will rout a larger area each time a cut is made, which means fewer cuts are necessary. However, if a groove for a spline joint is required to be routed into the bevel afterwards, then smaller diameter blade would be necessary. Also, for best results, all routing should be done in steps of not more than ⅛" at a time, until the desired depth is reached. Actual routing should always be done using an inward cutting action of the router bit in order to avoid any chance that break-outs could occur on the workpiece. This means, that the router guide apparatus should be slid from left to right when routing the upper edge of the bevel or mitre, and then slid from right to left when rot ting the lower edge. In both cases, the router bit should be only partly on the workpiece to ensure that only the most inward cutting sector of the router bit is used to cut the actual edges of the area being routed. For those areas of the bevel or mitre that lie in between the upper and lower cuts, the angle guide can be slid in either direction.

The material used for the router guide apparatus of the present invention is primarily metal but with some parts being made of hardwood, plastic, or rubber. However, it may be possible to have some of the metal or hardwood parts molded out of plastic instead. The material used for the guide bar assemblies is primarily hardwood, but painted particle board is satisfactory for the underbases. The guide bar spacers are made from painted hardwood, but the thinner ones are made of metal. These could also be molded out of plastic instead. Finally, the end holding clamp units are made from a combination of hardwood and metal, but with some rubber included. For commercial production, it will be appreciated that a wide variety of different materials could be used.

While the particular embodiment of the present invention has been illustrated and described, it would be obvious to those skilled in the art that various other changes and modifications can be made without departing from the spirit and scope of the invention. It is therefore intended to cover in the claims all of such changes and modifications that are within the scope of this invention. In particular, while various fastening means have been discussed in detail, numerous other fastening methods may be used just as effectively.

I claim:

1. A guide apparatus for use with a portable router, for enabling the router to rout an edge of a substantially planar workpiece, the router having a base and a router bit extending from the base, the guide apparatus comprising:

a main body for receiving the router base and including an opening for the router bit to extend therethrough;

a reference member having a planar surface for abutment with the planar surface of the workpiece and including a guide edge along one edge thereof;

a hinge means connecting the reference member to the main body;

a securing means for securing the reference member to the main body at a desired angle; and a guide bar securable relative to the workpiece and providing a first guide surface for abutting the guide edge of the reference member, whereby in use, with the router mounted on the main body, the router bit is guided along the edge of the workpiece.

2. A guide apparatus as claimed in claim 1, wherein the guide bar includes a rabbet along one side thereof, the rabbet providing a second guide surface substantially perpendicular to the first guide surface, for abutting a top surface of the reference member to maintain the reference member adjacent the planar surface of the workpiece.

3. A guide apparatus as claimed in claim 2, wherein the reference member includes a reference bar mounted adjacent said one edge thereof, wherein the guide edge is provided be the reference bar which, in use, abuts a surface of the guide bar.

4. A guide apparatus as claimed in claim 2, wherein the securing means comprises at least one plate secured to one of the reference member and the main body and including an arc-slot centered on the axis of the hinge means, and adjustable screw means secured to the other of the main body and the reference member and extending through the arc-slot for clamping the securing plate, to secure the reference member relative to the main body.

5. A guide apparatus as claimed in claim 4, wherein the securing means comprises a pair of generally quadrant-shaped securing plates, each secured to and extending upwardly from opposite sides of the reference member and each including an arc-shaped slot centered on the axis of the hinge means, and quadrant screw knobs engaging threaded bores of the main body and extending through the arc-shaped slots.

6. A guide apparatus as claimed in claim 4, wherein the main body comprises a tilting frame to which the hinge means is attached and a central cradle assembly, on which the router base is mounted, the central cradle assembly being slidably mounted with respect to the tilting frame for adjusting the relative position of the router bit, and second securing means for securing the cradle assembly in a desired position relative to the tilting frame.

7. A guide apparatus as claimed in claim 6, wherein the reference member comprises a reference plate and includes a cut out area along the other edge thereof.

8. A guide apparatus as claimed in claim 7, wherein the central cradle assembly comprises:
   (i) a platform having an opening for the router bit;
   (ii) a plurality of holding blocks attached to the top of said platform, said holding blocks providing curved surfaces defining a cradle for receiving the router base; and
   (iii) a plurality of adjustable holding clamps attached to the top of said platform, said holding clamps securing the router base to the top of said platform and within the central cradle assembly.

9. A guide apparatus as claimed in claim 8, wherein the tilting frame comprises two side members and two longitudinal members extending between and joining the side members, and wherein the central cradle assembly includes side wings overlapping the side members of the tilting frame, wherein bores are provided in one of the side wings and the side members and slots are provided in the other of the side wings and the side wing members, with the side wings and side members comprising pairs and with each side wing and side member pair having one slot and one hole, and second screw members extending through the slots into the bores and provided with second screw knobs for actuation thereof, to clamp the side wings and side members together, for securing the central cradle assembly in position.

10. A guide apparatus as claimed in claim 9, wherein each side wing overlaps one of the side members, wherein each side member includes one threaded second bore and each side wing includes an elongate slot.

11. A guide apparatus as claimed in claim 10, wherein said side members fastened to longitudinal members form a substantially rectangular tilting frame.

12. A guide apparatus as claimed in claim 11, wherein the securing means comprises a pair of generally quadrant-shaped securing plates, each secured to and extending upwardly from opposite sides of the reference member and each including an arc-shaped slot centered on the hinge axis, and quadrant screw knobs engaging threaded bores of the main body and extending through the arc-shaped slots.

13. A guide apparatus as claimed in claim 12, further including a gauge, said gauge having calibrations corresponding to a desired cutting angle for setting the proper setback distance of said guide bar from the edge of said workpiece.

14. A guide apparatus as claimed in claim 1, further including a pair of end holding clamp units, each end holding clamp unit comprising:
   a unit body; and
   a spike assembly having at least one press-fit spike projecting from one end thereof from one end of the unit body for engaging a workpiece, to secure a workpiece on a support surface.

15. A guide apparatus as claimed in claim 14, wherein each end holding clamp unit includes an end-stop bracket mounted on top of the unit body for limiting travel of the router; and side tabs attached to the front of the unit body at substantially opposite ends of the unit body, for abutting an edge of a support surface.

16. A guide apparatus as claimed in claim 15, in combination with a plurality of spacers, for spacing at least one of a workpiece and the guide bar underbase from a support surface.

17. The guide apparatus as claimed in claim 2, further comprising a guide bar underbase, wherein the guide bar is mounted onto the guide bar underbase and the guide bar underbase forms a ledge along the rabbeted side of the guide bar, whereby in use, the ledge provides a supporting surface for the reference member.

18. The guide apparatus as claimed in claim 17, further comprising at least one guide bar spacer, whereby the thickness of the guide bar underbase together with the thickness of the guide bar spacers substantially equal the thickness of the workpiece.

19. A method of using a portable router for routing a workpiece, said router having a base and a router bit extendable through said base, the method comprising the steps of:
   (i) providing a main body for receiving said router base therein, said main body having an opening for said router bit;
   (ii) providing a reference member rotatably hinged to the main body and including a guide edge along one edge thereof;
   (iii) providing a securing means for adjustably securing the main body relative to the reference member;
   (iv) providing a guide bar having a first guide surface and a second guide surface;
   (v) mounting the guide bar on the workpiece in a desired position relative to an edge of the workpiece;
   (vi) mounting the router onto the main body, fitting a selected router bit into the router, and securing the main body at a desired angle to the reference member with the securing means;
   (vii) locating the reference member on the workpiece with the guide edge abutting the first guide surface of the guide bar and the top surface of the reference member abutting the second guide surface of the guide bar; and
   (viii) operating the router and traversing the reference member across the workpiece while maintaining the guide edge in contact with the guide surface, to cut a desired profile along the workpiece.

20. A method as claimed in claim 19, further including the steps of:
   (a) providing a pair of end holding clamp units, each having a unit body and a spike assembly having at least one press-fit spike projecting from one end of the unit body;
   (b) driving said press-fit spikes into opposite ends of the workpiece so as to hold said workpiece; and
   (c) clamping said end holding clamp units onto a table to support the workpiece for routing.

21. A guide apparatus for use with a portable router, for enabling the router to rout an edge with a substantially planar workpiece, the router having a base and a router bit extending from the base, the guide apparatus comprising:

a reference member having a planar surface for abutment with the planar surface of the workpiece and including a guide edge on one edge thereof, and an opening for the router bit to extend therethrough, the reference member being configured to receive and locate the router base; and a guide bar securable relative to the workpiece, and providing a first guide surface for abutting the guide edge, and a second guide surface for abutting the top surface of the reference member, whereby in use with the router mounted on the reference member, the router bit is guided along the edge of the workpiece.

22. A method of using a portable router for routing a workpiece, said router having a base and a router bit extendable through said base, the method comprising the steps of:

(1) providing a reference member including a guide edge along one edge thereof and an opening for the router bit;
(2) locating the router base on the reference member;
(3) providing a guide bar having a first guide surface for abutting the guide edge, and a second guide surface for abutting the top surface of the reference member, and securing the guide bar relative to the workpiece; and
(4) maintaining the reference member in abutment with the workpiece and the guide edges thereof in contact with the guide surfaces of the guide bar, and traversing the reference member and the router across the workpiece, whereby the router bit routs an edge of the workpiece.

* * * * *